US009065668B1

(12) United States Patent
Katar et al.

(10) Patent No.: US 9,065,668 B1
(45) Date of Patent: Jun. 23, 2015

(54) DISTRIBUTED BANDWIDTH CONTROL IN A COMMUNICATION NETWORK

(75) Inventors: Srinivas Katar, Gainesville, FL (US); Lawrence W. Yonge, III, Ocala, FL (US); James G Zyren, Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1082 days.

(21) Appl. No.: 13/019,775

(22) Filed: Feb. 2, 2011

Related U.S. Application Data

(60) Provisional application No. 61/300,660, filed on Feb. 2, 2010.

(51) Int. Cl.
*G01R 31/08* (2006.01)
*H04L 12/26* (2006.01)

(52) U.S. Cl.
CPC ...................................... *H04L 12/26* (2013.01)

(58) Field of Classification Search
None
See application file for complete search history.

(56) References Cited

U.S. PATENT DOCUMENTS

| 5,175,537 | A  | * | 12/1992 | Jaffe et al. ...................... 370/447 |
| 6,085,216 | A  |   | 7/2000  | Huberman et al. |
| 8,447,541 | B2 |   | 5/2013  | Rada |
| 2001/0055311 | A1 | * | 12/2001 | Trachewsky et al. ......... 370/445 |
| 2003/0067940 | A1 |   | 4/2003  | Edholm |
| 2004/0030797 | A1 |   | 2/2004  | Akinlar et al. |
| 2007/0153916 | A1 |   | 7/2007  | Demircin et al. |
| 2009/0096592 | A1 | * | 4/2009  | Wu et al. .................. 340/310.12 |
| 2009/0290491 | A1 |   | 11/2009 | Karagiannis et al. |
| 2010/0046555 | A1 |   | 2/2010  | Elliott |
| 2010/0183104 | A1 | * | 7/2010  | Alexander et al. ............ 375/346 |
| 2011/0019563 | A1 |   | 1/2011  | Serrano Solsona et al. |
| 2011/0202910 | A1 | * | 8/2011  | Venkatakrishnan et al. .. 717/171 |
| 2012/0106342 | A1 | * | 5/2012  | Sundararajan et al. ....... 370/235 |
| 2012/0155260 | A1 | * | 6/2012  | Vasseur et al. ............. 370/230.1 |
| 2012/0275307 | A1 | * | 11/2012 | Godbole et al. .............. 370/236 |
| 2013/0077549 | A1 |   | 3/2013  | Chhabra et al. |

OTHER PUBLICATIONS

"U.S. Appl. No. 13/019,765 Office Action", Apr. 10, 2014, 23 pages.
Co-Pending U.S. Appl. No. 13/019,765, filed Feb. 2, 2011, 53 pages.
"U.S. Appl. No. 13/019,765 Final Office Action", Sep. 24, 2014, 50 Pages.

* cited by examiner

*Primary Examiner* — Jung-Jen Liu
(74) *Attorney, Agent, or Firm* — DeLizio Law, PLLC

(57) ABSTRACT

Network devices of a particular device class can implement a distributed bandwidth control (DBC) protocol to utilize resources of a communication network in accordance with a threshold amount of resources allocated for DBC device communication. A DBC device of a plurality of DBC devices can determine a transmission cost associated with a pending DBC transmission. The pending DBC transmission is initiated. A delay time period associated with the initiated pending DBC transmission can be calculated based, at least in part, on the transmission cost associated with the initiated DBC pending transmission and a threshold transmission cost associated with DBC device communications. Subsequent transmissions of the DBC device and all other DBC devices in the communication network can be delayed by at least the delay time period associated with the initiated pending DBC transmission of the DBC device.

29 Claims, 9 Drawing Sheets

DISTRIBUTED BANDWIDTH CONTROL IN A COMMUNICATION NETWORK

INTRODUCTION

Embodiments of the inventive subject matter generally relate to the field of communications systems, and, more particularly, to a distributed bandwidth control mechanism in a communication network.

Communication networks can share a common communication medium and network devices in each of the communication networks can have different capabilities and requirements. For example, each unit (e.g., a home) in a multi-dwelling unit (MDU) can comprise a powerline communication network and each of the powerline communication networks can communicate via a common powerline communication medium. Various communication medium access control techniques can be implemented for regulating the amount of communication medium resources that can be consumed by the network devices of each of the communication networks. Some examples include centrally controlled mechanisms (e.g., time division multiple access (TDMA), and frequency division multiple access (FDMA), etc.), token-passing approaches (e.g., token bus, token ring, IEEE 803.4, IEEE 802.5, etc.), carrier sense multiple access (CSMA), traffic shaping mechanisms (e.g., token bucket, leaky bucket), etc.

SUMMARY

Various embodiments of a distributed bandwidth control mechanism in a communication network are disclosed. In one embodiment, a transmission cost associated with a pending transmission of a first network device is determined at the first network device of a plurality of network devices of a predefined class of network devices of a communication network. The pending transmission of the first network device is initiated. A delay time period associated with the initiated pending transmission of the first network device is calculated based, at least in part, on the transmission cost associated with the initiated pending transmission and a threshold transmission cost associated with the predefined class of network devices of the communication network. Subsequent transmissions of the first network device are delayed by at least the delay time period associated with the initiated pending transmission of the first network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
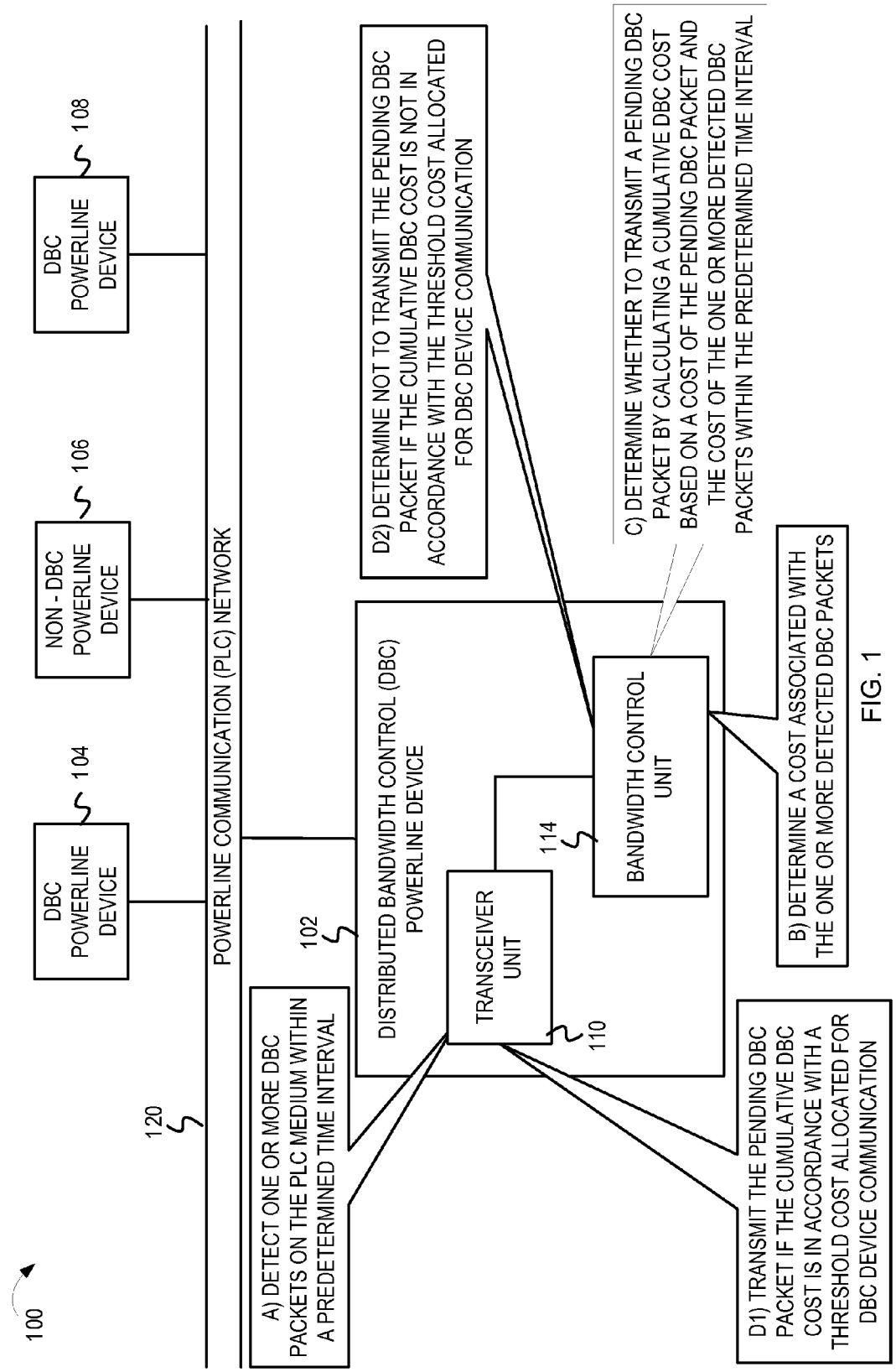
FIG. 1 is an example block diagram illustrating a distributed bandwidth control mechanism.

The description that follows includes exemplary systems, methods, techniques, instruction sequences, and computer program products that embody techniques of the present inventive subject matter. However, it is understood that the described embodiments may be practiced without these specific details. For instance, although examples refer to a Distributed Bandwidth Control (DBC) mechanism for powerline communication networks, in other embodiments a DBC mechanism can be implemented in other types of wired and wireless communication networks (e.g., wireless local area network (WLAN), Ethernet networks, etc.). In other instances, well-known instruction instances, protocols, structures, and techniques have not been shown in detail in order not to obfuscate the description.

In a powerline communication medium, powerline devices of different device classes can share the powerline communication medium. For example, a first class of powerline devices (e.g., HomePlug® devices) may share the powerline communication medium with a second class of powerline devices (e.g., Green PHY devices). HomePlug devices may be capable of high-speed transmission (5-150 Mbps) and may typically control the powerline communication medium for a significant amount of time for effective communication. Green PHY devices may utilize a relatively low aggregate bandwidth (256 Kbps). Typically, communications of the HomePlug devices have a higher priority as compared to communications of the Green PHY devices. Therefore, when the Green PHY devices and the HomePlug devices share the powerline communication medium, the communications of the Green PHY devices should not ideally interfere (or prevent) the communications of the HomePlug devices. In other words, the HomePlug devices ideally should be allocated a larger percentage of the resources of the powerline communication medium.

In some embodiments, network devices that belong to a particular device class can be configured to implement a distributed bandwidth control (DBC) protocol that enables the network devices of the particular device class ("DBC devices") to limit the total amount of resources they consume. Each of the DBC devices can independently track the cost (e.g., transmission time) associated with their respective transmissions and can also track the cost associated with transmissions initiated by other DBC devices on the communication medium. Based on the cost of previous transmissions from all the DBC devices in a predetermined time interval, a DBC device can determine when/whether to initiate a new DBC transmission. For example, the total bandwidth allocated for communication by the DBC devices may be limited to 7%. In other words, the DBC devices, collectively, may be able to initiate DBC transmissions with a total transmission time of 2.1 ms every 30 ms. On determining to initiate a pending DBC transmission, a DBC device can evaluate the DBC transmissions previously initiated by other DBC devices and can prevent initiating the pending DBC transmission (e.g., until a next 30 ms time interval) if the sum of the transmission time of the previous DBC transmissions plus the transmission time of the pending DBC transmission would be greater than 7% of a predefined time period (e.g., greater than 2.1 ms of a 30 ms time interval). In some embodiments, rather than evaluating the cost associated with one or more DBC transmissions to determine whether to initiate the pending DBC transmission, the DBC device can initiate the pending DBC transmission regardless of the cost. After the DBC transmission is initiated, the DBC device can cause all the DBC devices on the communication medium to delay corresponding subsequent DBC transmissions for a delay time interval determined based, at least in part, on a transmission time of the initiated DBC transmission. Thus, the DBC devices can ensure that the network resources (e.g., bandwidth, transmission time, etc.) consumed by the DBC transmissions (e.g., in a predetermined time interval) are in accordance with a corresponding resource consumption threshold (e.g., a threshold bandwidth utilization, a threshold transmission time, etc.) allocated for DBC device communication. This can enable the DBC devices (e.g., Green PHY devices) to share the communication medium with other non-DBC devices (e.g., HomePlug devices), which may or may not be capable of executing the DBC protocol.

FIG. 1 is an example block diagram illustrating a distributed bandwidth control mechanism. FIG. 1 depicts distributed bandwidth control (DBC) powerline devices 102, 104, and 108 and a non-DBC powerline device 106. The DBC powerline devices 102, 104, and 108 and the non-DBC powerline device 106 comprise a powerline communication (PLC) network 100 supported by a PLC medium 120. The DBC powerline device 102 comprises a transceiver unit 110 and a bandwidth control unit 114. Although not shown in FIG. 1, it is noted that the DBC powerline devices 104 and 108 can also include a transceiver unit and bandwidth control unit (as shown for DBC powerline device 102). In one example, the DBC powerline devices 102, 104, and 108 can be Green PHY (GP) devices that have low data rate and low bandwidth requirements. In one example, the non-DBC powerline device 106 can be a HomePlug device (e.g., HP1, HPAV, etc.) that has high data rate and high bandwidth requirements. It is noted, however, that the PLC network may comprise any number of DBC powerline devices and non-DBC powerline devices.

At stage A, the transceiver unit 110 detects one or more DBC packets within a predetermined time interval on the PLC medium 120. The DBC powerline device 102 can monitor protocol data units (PDUs) or packets transmitted via the PLC medium 120 within the PLC network 100. The transceiver unit 110 may detect all transmissions on the PLC medium 120 including transmissions from the other DBC powerline devices (e.g., devices 104 and 108) and transmissions from one or more non-DBC powerline devices (e.g., device 106). For each packet the DBC powerline device 102 detects, the DBC powerline device 102 can determine whether the detected packet was transmitted by a DBC powerline device or by a non-DBC powerline device of the PLC network 100. In one implementation, the DBC powerline device 102 can determine whether another DBC powerline device transmitted the detected packet based on a source address of the detected packet. For example, the DBC powerline device 102 can read a source address field in a header of the detected packet. The DBC powerline device 102 can access a pre-configured list of addresses associated with all the DBC powerline devices within the PLC network 100 and can determine whether the source address matches one of the addresses in the pre-configured list of addresses. If there is a match, the DBC powerline device 102 can determine that another DBC powerline device transmitted the detected packet. In another implementation, the packets transmitted by the DBC powerline devices 102, 104, and 108 can comprise one or more special fields to distinguish the packets transmitted by the DBC powerline devices ("DBC packets") from packets transmitted by the non-DBC powerline devices. On detecting a packet, the DBC powerline device 102 can determine whether the detected packet comprises the one or more special fields. If so, the DBC powerline device 102 can classify the detected packet as a DBC packet. In another implementation, the DBC powerline device 102 can read a value of a device identification field from the detected packet. The device identification field comprising a first predetermined value can indicate that the detected packet is a DBC packet, while the device identification field comprising a second predetermined value can indicate that the detected packet is not a DBC packet. The DBC powerline device 102 can keep track of the one or more DBC packets detected within a predetermined time interval. As will be described below, a cost associated with the one or more DBC packets detected within the predetermined time interval can be used to determine whether (and how many) subsequent pending DBC packets can be transmitted.

At stage B, the bandwidth control unit 114 determines a cost associated with the one or more DBC packets detected at stage A. In one implementation, the bandwidth control unit 114 can determine the cost associated with each DBC packet as a transmission time associated the DBC packet. For example, the bandwidth control unit 114 can determine that two DBC packets were detected in the predetermined time interval. The bandwidth control unit 114 may determine that one of the DBC packets had a transmission time of 2 ms and that the other DBC packet had a transmission time of 3 ms. Accordingly, the bandwidth control unit 114 can determine that the cost associated with the DBC packets detected in the predetermined time interval is 5 ms. In another implementation, the bandwidth control unit 114 can determine the cost of the DBC packet as a weighted combination of one or more attributes of the DBC packet. For example, attributes such as priority, type, duration of transmission, transmission rate, total payload size, etc. can used to evaluate the cost associated with each of the DBC packets. In one implementation, the bandwidth control unit 114 can keep track of the attributes associated with the one or more DBC packets detected within the predetermined time interval and can accordingly calculate the cost associated with the one or more DBC packets as needed. In another implementation, the bandwidth control unit 114 can pre-calculate and store the cost associated with the one or more DBC packets. The bandwidth control unit 114 can update the stored cost as a new DBC packet is detected and/or as the predetermined time interval is shifted ahead in time.

At stage C, the bandwidth control unit 114 determines whether to transmit a pending DBC packet (generated by the DBC powerline device 102) by calculating a cumulative DBC cost based on a cost of the pending DBC packet and the cost of the one or more detected DBC packets within the predetermined time interval. In one implementation, the bandwidth control unit 114 can calculate the cost of the pending DBC packet after the pending DBC packet is generated. In another implementation, the bandwidth control unit 114 can calculate the cost of the pending DBC packet based on a transmit data rate, a length of the pending DBC packet, and other transmission parameters. As described above, in one implementation, the bandwidth control unit 114 can estimate the transmission time of the pending DBC packet (e.g., based on a transmit data rate, length of the pending DBC packet, etc.) and can use the estimated transmission time as the cost of the pending DBC packet. In another implementation, the bandwidth control unit 114 can calculate the cost of the pending DBC packet based on one or more attributes of the pending DBC packet. The bandwidth control unit 114 can then add the cost of the pending DBC packet to the cost of the one or more detected DBC packets in the predetermined time interval (calculated at stage B) to yield the cumulative DBC cost. As will be described with reference to stages D1 and D2, the bandwidth control unit 114 can determine whether to transmit the pending DBC packet via the PLC medium 120 based on the cumulative DBC cost.

At stage D1, the bandwidth control unit 114 causes the transceiver unit 110 to transmit the pending DBC packet if the cumulative DBC cost is in accordance with a threshold cost allocated for DBC device communication. The threshold cost allocated for DBC device communication can be a predefined maximum bandwidth utilization associated with the PLC medium 120 that is allocated for DBC powerline devices. In one example, the predetermined maximum bandwidth utilization of the PLC medium 120 by DBC powerline devices 102, 104, and 108 may be 7%. In one implementation, the bandwidth control unit 114 can determine a threshold transmission cost based on the predefined maximum bandwidth utilization. Thus, if the predetermined time interval is Xms, the threshold transmission cost allocated for DBC device communication can be 0.07 Xms. The bandwidth control unit 114 can compare the cumulative DBC cost (calculated at stage C) with the threshold cost allocated for DBC device communication to determine whether transmitting the pending DBC packet will cause the threshold cost to be exceeded. For example, if the predetermined time interval is 100 ms and the predetermined maximum bandwidth utilization is 7%, the threshold transmission cost allocated for DBC device communication is 7 ms. In this example, if the transmission cost of the DBC packets detected in the 100 ms time interval is 4 ms, and the transmission cost associated with the pending DBC packet is 2 ms, the bandwidth control unit 114 can determine that transmitting the pending DBC packet will not violate the threshold transmission cost allocated for DBC device communication. Thus, the bandwidth control unit 114 can cause the transceiver unit 110 to transmit the pending DBC packet to a destination DBC powerline device via the PLC medium 120.

At stage D2, the bandwidth control unit 114 determines not to transmit the pending DBC packet if the cumulative DBC cost is not in accordance with the threshold cost allocated for DBC device communication. For example, if the predetermined time interval is 100 ms and the predetermined maximum bandwidth utilization is 7%, the threshold transmission cost allocated for DBC device communication is 7 ms. In this example, if the transmission cost of the DBC packets detected in the 100 ms time interval is 6 ms, and the transmission cost associated with the pending DBC packet is 3 ms, the bandwidth control unit 114 can determine that transmitting the pending DBC packet will violate the threshold transmission cost allocated for DBC device communication. The bandwidth control unit 114 can determine that the DBC powerline device 102 should not be permitted to contend for the PLC medium 120. The bandwidth control unit 114 can cause the transceiver unit 110 to halt all transmissions in an attempt to reduce the cumulative cost by the passage of time (i.e., as DBC packets whose cost contributed to the cumulative cost fall outside the predetermined time interval and become too old to be considered as part of the cumulative cost).

Figure 2:
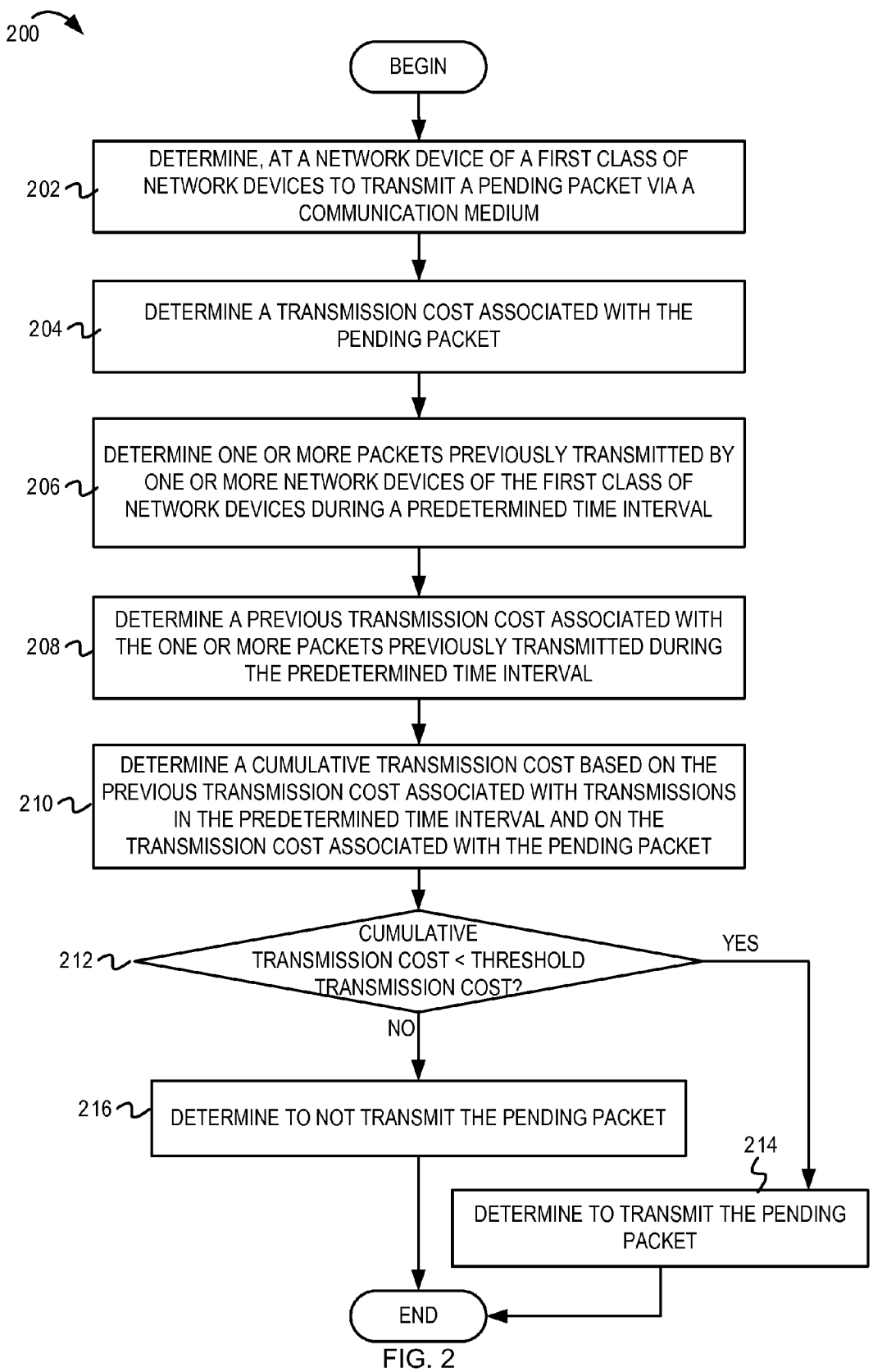
FIG. 2 is a flow diagram illustrating example operations for implementing a distributed bandwidth control mechanism.

FIG. 2 is a flow diagram ("flow") 200 illustrating example operations for implementing a distributed bandwidth control mechanism. The flow begins at the block 202.

At block 202, it is determined at a network device of a first class of network devices to transmit a pending packet via a communication medium. For example, with reference to FIG. 1, the DBC powerline device 102 can determine to transmit a pending DBC packet via the PLC medium 120. The flow continues at block 204.

At block 204, a transmission cost associated with the pending packet is determined. For example, the bandwidth control unit 114 can analyze the pending DBC packet and can determine the transmission cost associated with the pending DBC packet. In one implementation, the bandwidth control unit 114 can determine a transmission time associated with the pending DBC packet to determine the transmission cost. In another implementation, the bandwidth control unit 114 may determine the transmission cost by determining a weighted combination of one or more attributes (e.g., priority, type, duration of transmission, transmission rate, total payload size, bandwidth utilization, etc.) of the pending DBC packet. It is noted that various other techniques can be implemented for determining the transmission cost associated with the pending DBC packet. For example, the transmission cost associated with the pending DBC packet may be a pre-determined value assigned to the pending DBC packet depending on the type of the packet, the priority of the packet, and/or other attributes. For example, high priority DBC packets may be assigned a cost of "1", other DBC packets may be assigned a cost of "2", etc. The flow continues at block 206.

At block 206, one or more packets previously transmitted by one or more network devices of the first class of network devices during a predetermined time interval are determined. The determined one or more packets previously transmitted during the predetermined time interval can include packets transmitted by the first network device and also packets transmitted by other network devices of the first class of network devices coupled to the communication medium. For example, the bandwidth control unit 114 can identify one or more DBC packets previously transmitted by the DBC powerline devices 102, 104, and 108 (and other DBC powerline devices on the PLC medium 120 within the PLC network 100) during the predetermined time interval. The predetermined time interval may be an interval of time that precedes a current time instant. For example, if the predetermined time interval is 100 ms, at current time instant t=150 ms, the DBC packets previously transmitted during the time interval between t=50 ms and t=150 ms can be determined. The predetermined time interval can be predefined based on device and/or protocol implementations and specifications. In one implementation, the predetermined time interval may be selected to be large enough to enable DBC powerline devices to perform a plurality of transmissions during the predetermined time interval (e.g., considering the minimum or average size or duration of DBC device transmissions). In another implementation, the predetermined time interval may be selected based on a maximum size or duration of DBC device transmissions. In another implementation, the predetermined time interval may be selected to be equal to (or a multiple of) a beacon interval of the DBC powerline device 102. In one implementation, the predetermined time interval could be specified in terms of a length of time (e.g., Xms), as described with reference to FIG. 3A. In another implementation, the predetermined time interval could be indicated in terms of a number of bins where each bin corresponds to a subset of the predetermined time interval, as described with reference to FIG. 3B. As will be described below, the bandwidth control unit 114 can determine the one or more DBC packets previously transmitted during the predetermined time interval by detecting each DBC packet (transmitted by any of the DBC devices 102, 104, and 108) and by storing an indication of a transmission cost associated with the detected DBC packet. The flow continues at block 208.

At block 208, the transmission cost corresponding to the one or more packets previously transmitted by network devices of the first class of network devices during the predetermined time interval ("previous transmission cost") is determined. For example, the bandwidth control unit 114 can determine the previous transmission cost associated with the one or more detected DBC packets transmitted by the DBC powerline devices 102, 104, and 108 during the predetermined time interval. In one implementation, the bandwidth control unit 114 can determine the previous transmission cost by aggregating a transmission time associated with each of the detected DBC packets previously transmitted within the predetermined time interval. In another implementation, the bandwidth control unit 114 can take into consideration one or more parameters of the detected DBC packets (e.g., a length of the packet, a transmission rate, a transmit time, bandwidth utilization, etc.) when calculating the previous transmission cost. In another implementation, the bandwidth control unit 114 can read a pre-calculated (or pre-assigned) transmission cost associated with the one or more detected DBC packets previously transmitted within the predetermined time interval. For example, the bandwidth control unit 114 can detect a DBC packet on the PLC medium 120, calculate the transmission cost of the detected DBC packet, and accordingly update the previous transmission cost. Furthermore, in some implementations, the DBC powerline device 102 may, itself, calculate the transmission cost associated with each of the detected DBC packets as the DBC packets are detected. In other implementations, the bandwidth control unit 114 may read a cost field in a header of a detected DBC packet to determine the transmission cost of the detected DBC packet (calculated by the DBC powerline device that transmitted the detected DBC packet). The flow continues at block 210.

At block 210, a cumulative transmission cost is determined based on the transmission cost associated with transmissions during the predetermined time interval and the transmission cost associated with the pending packet. For example, the bandwidth control unit 114 can sum the previous transmission cost associated with the one or more DBC packets detected during the predetermined time interval (determined at block 208) with the transmission cost associated with the pending DBC packet (determined at block 204) to yield the cumulative transmission cost. In some implementations, the bandwidth control unit 114 could calculate a weighted sum of the previous transmission cost associated with the one or more DBC packets detected during the predetermined time interval and the transmission cost associated with the pending DBC packet. As will be described below, based on the cumulative transmission cost, the bandwidth control unit 114 can determine whether the pending DBC packet should be transmitted via the PLC medium 120. In some implementations, if the DBC powerline device 102 comprises more than one pending DBC packet to be transmitted, the bandwidth control unit 114 can calculate a combined cumulative transmission cost comprising the transmission costs associated with all the pending DBC packets and can determine if all the pending DBC packets can be transmitted. In another implementation, the bandwidth control unit 114 can select one or more of the pending DBC packets to be transmitted based on the priority of the packets, the transmission cost associated with each of the pending DBC packets, available bandwidth for DBC communication, etc. The flow continues at block 212.

At block 212, it is determined whether the cumulative transmission cost is less than a threshold transmission cost allocated for communication by network devices of the first class of network devices. For example, the bandwidth control unit 114 can determine whether the cumulative transmission cost is greater than the threshold transmission cost allocated for DBC device communication. In one implementation, the threshold transmission cost can be determined based on a predefined maximum bandwidth utilization associated with the PLC medium 120 that is allocated for DBC communications. For example, it may be determined that the DBC powerline devices 102, 104, and 108 should utilize only 7% of the communication bandwidth of the PLC medium 120. In this example, if the predetermined time interval is 50 ms, the threshold transmission cost may be 7% of 50 ms (i.e., 3.5 ms). In another implementation, the threshold transmission cost allocated for DBC device communication may be calculated as a weighted combination of one or more threshold communication attributes. For example, the threshold transmission cost allocated for DBC device communication can be a weighted combination of the threshold time allocated for DBC device communication, the threshold bandwidth utilization allocated for DBC device communication, the maximum DBC packet size, etc. If it is determined that the cumulative transmission cost is less than the threshold transmission cost, the flow continues at block 214. Otherwise, the flow continues at block 216.

At block 214, the first network device of the first class of network devices transmits the pending packet via the communication medium. For example, the transceiver unit 110 can transmit (based on an indication from the bandwidth control unit 114) the pending DBC packet via the PLC medium 120. The flow 200 moves from block 212 to block 214 on determining that the threshold transmission cost allocated for DBC device communication will not be exceeded if the pending DBC packet is transmitted. The DBC powerline device 102 that generated the pending DBC packet can then contend for the PLC medium 120 (e.g., with the non-DBC powerline device 106, with other DBC powerline devices 104, 108, etc.) and can transmit the pending DBC packet on gaining control of the PLC medium 120. From block 214, the flow ends.

Figure 4:
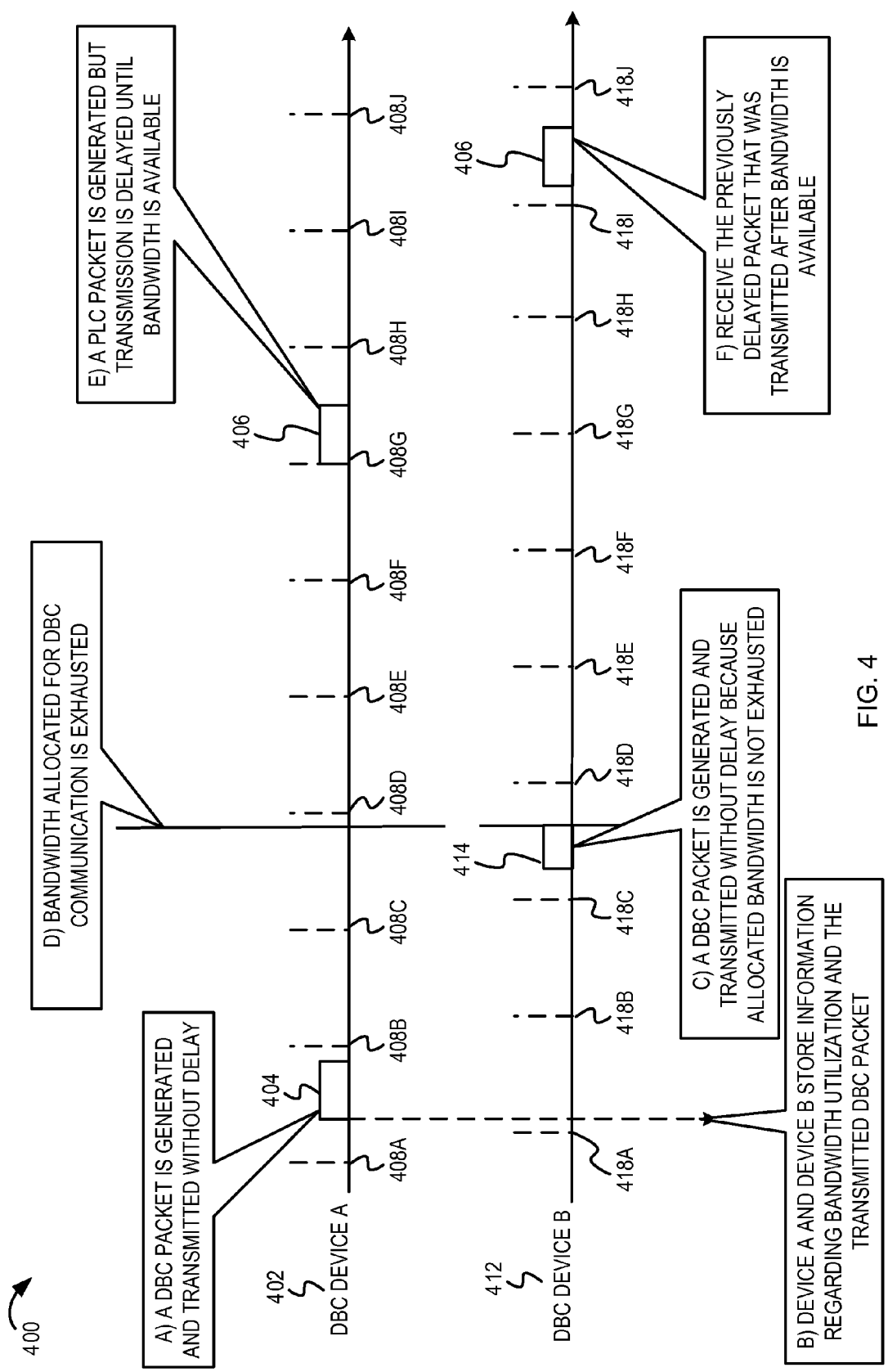
FIG. 4 is an example sequence diagram illustrating transmission of packets using the DBC protocol.

At block 216, the first network device of the first class of network devices determines to not transmit the pending packet. The flow 200 moves from block 212 to block 216 on determining that the threshold transmission cost allocated for DBC device communication will be exceeded if the pending DBC packet is transmitted. For example, the bandwidth control unit 114 can determine that the pending DBC packet generated by the DBC powerline device 102 should not be transmitted. The bandwidth control unit 114 can cause the transceiver unit 110 to not transmit any subsequent DBC packets until a predetermined wait time interval is elapsed and/or until sufficient bandwidth is available for transmission of the DBC packets. For example, the bandwidth control unit 114 can cause the transceiver unit 110 and the DBC powerline device 102 to delay subsequent transmissions until the cumulative transmission cost is reduced by the passage of time. FIG. 4 further illustrates DBC powerline devices determining whether to transmit DBC packets based on utilization of bandwidth allocated for DBC device communication. From block 216, the flow ends.

Figure 3A:
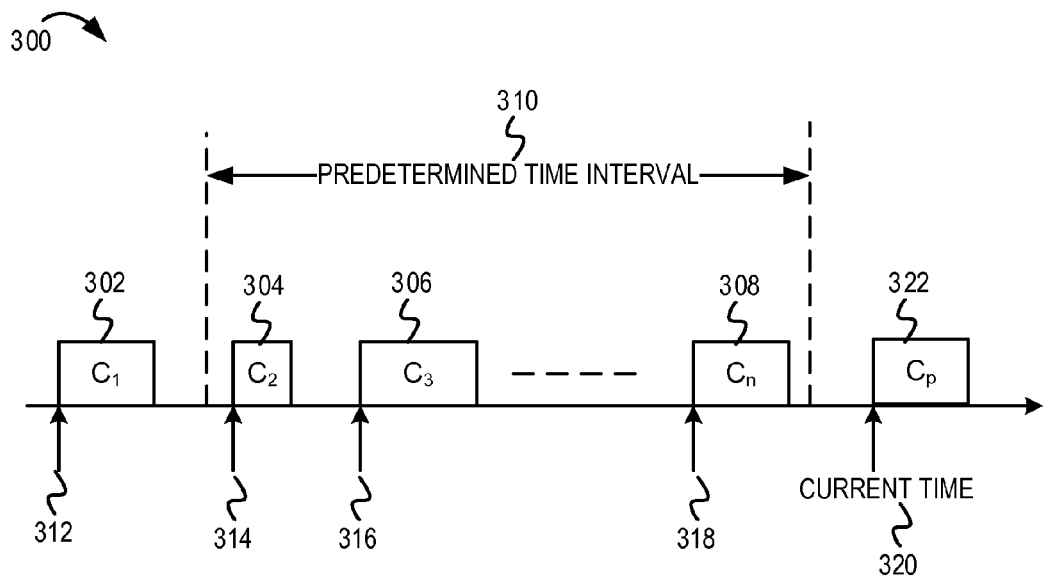
FIG. 3A is a conceptual diagram illustrating an example embodiment of a time-interval based DBC protocol.

FIG. 3A is a conceptual diagram illustrating an example embodiment of a time-interval based DBC protocol, which can be implemented in the PLC network 100 described above with references to FIGS. 1-2. FIG. 3A depicts DBC packets transmitted via the PLC medium 120 (by the DBC devices 102, 104, and 108 of the PLC network 100) and the transmission cost associated with each of the DBC packets. At time instant 312, a DBC packet with transmission cost C1 302 is detected on the PLC medium 120. Also, a DBC packet with transmission cost C2 304 is detected at time instant 314, a DBC packet with transmission cost C3 306 is detected at time instant 316, and a DBC packet with transmission cost Cn 308 is detected at time instant 318. Each of the DBC powerline devices 102, 104, and 108 can store information about the time instant at which various packets were detected on the PLC medium 120 and the transmission cost associated with each of the detected DBC packets (for their own transmissions and for transmissions from other DBC powerline devices). In the example shown in FIG. 3A, the predetermined time interval 310 across which the transmission cost of previously transmitted DBC packets is analyzed comprises the time instants 314, 316, and 318. At current time instant 320, the DBC powerline device 102 may determine to transmit a pending DBC packet with transmission cost $C_p$ 312. The DBC powerline device 102 (e.g., the bandwidth control unit 114) can use the stored information to determine the transmission cost of all the DBC packets transmitted within the predetermined time interval 310. With reference to FIG. 3A, the bandwidth control unit 114 can determine that the transmission cost of the DBC packets transmitted within the predetermined time interval 310 is $S=(C_2+C_3+\ldots+C_n)$. If the threshold transmission cost allocated for DBC device communication is L, the bandwidth control unit 114 can determine to transmit the pending DBC packet if $C_p<L-S$ or if $C_p+S<L$.

Figure 3B:
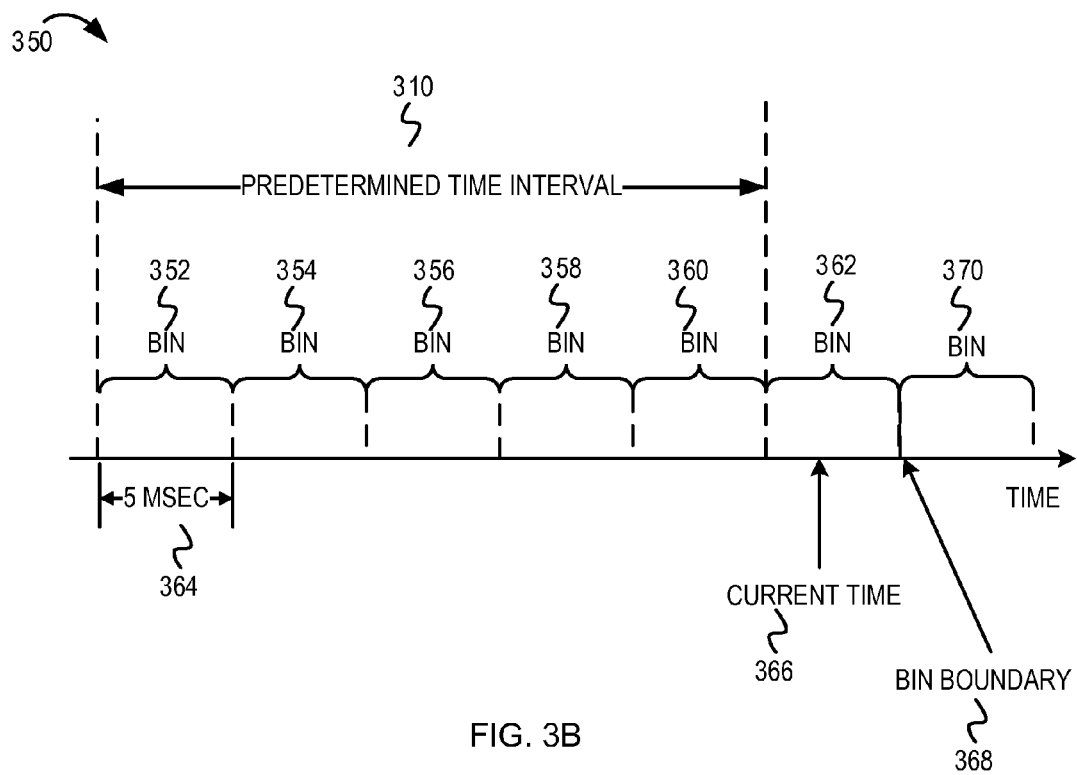
FIG. 3B is a conceptual diagram illustrating an example embodiment of a bin-based DBC protocol.

FIG. 3B is a conceptual diagram illustrating an example embodiment of a bin-based DBC protocol, which can be implemented in the PLC network 100 described above with references to FIGS. 1-2. FIG. 3B depicts a plurality of bins, each of which spans a predetermined bin interval 364 (e.g., 5 ms). As depicted by FIG. 3B, time is divided into 5 ms bins. If the length of the predetermined time interval 310 is T ms, each DBC device can maintain N+1 logical bins of T/N milliseconds each. For example, if the predetermined time interval is 30 ms, the DBC devices can maintain 6 logical bins (N=5) of 5 ms each. Bins 352, 354, 356, 358, and 360 constitute the predetermined time interval 310 at current time instant 366. The current time instant 366 falls within current bin 362. In one implementation, each DBC powerline device 102, 104, and 108 can maintain a timer to determine bin boundaries. The bin boundaries can indicate time instants at which the current bin expires and a new current bin starts. For example, when the bin interval 364 is 5 ms, each DBC powerline device 102, 104, and 108 can maintain a 5 ms timer. The DBC powerline device can switch to a new current bin at each 5 ms interval, as will be described below. Furthermore, each of the DBC powerline devices 102, 104, and 108 can track the number of DBC packets transmitted in each of the previous N bins and the number of DBC packets transmitted in the current bin. Each DBC powerline device 102, 104, and 108 can also maintain a buffer (e.g., a circular buffer) to store the total transmission cost of the DBC packets transmitted/detected in each bin that comprises the predetermined time interval 310 and to store the transmission cost associated with the current bin. With reference to FIG. 3B, each of the DBC powerline devices 102, 104, and 108 can store (in the buffer) a transmission cost associated with the previous five bins 352, 354, 356, 358, and 360 and a transmission cost associated with the current bin 362. The transmission cost associated with each of the previous five bins 352, 354, 356, 358, and 360 can be accessed from a data structure (or may be calculated on the fly). For example, if three DBC packets were detected in the bin 352, the transmission cost associated with bin 352 may be a combined transmission cost of the three DBC packets detected during the time interval that corresponds to the bin 352. The transmission costs associated with the previous five bins 352, 354, 356, 358, and 360 can be summed together to determine the previous transmission cost (S) associated with the DBC packets transmitted during the predetermined time interval 310. The previous transmission cost S and the transmission cost associated with the current bin 362 can be analyzed to determine whether pending DBC packets can be transmitted at the current time instant 366.

To determine if the pending DBC packet should be transmitted, the sum S calculated above, the transmission cost of the current bin 362, and the transmission cost of the pending DBC packet can be added to yield the cumulative transmission cost. The cumulative transmission cost can be compared against the threshold transmission cost allocated for DBC device communication. In one example, the maximum bandwidth utilization of the PLC medium 120 allocated for DBC device communication may be 7%. If transmission time is used as a cost function and the predetermined time interval is 30 ms, the DBC powerline devices may cumulatively transmit for only 7% of the 30 ms time interval (i.e., the time interval comprising 5 previous bins and the current bin) or 2.1 ms. If the cumulative transmission cost is greater than the threshold transmission cost, the DBC powerline device 102 can wait until the cumulative transmission cost is no greater than the threshold transmission cost.

In one implementation, a reference associated with each DBC packet (e.g., a transmit start time) can be used to determine the bin to which the DBC packet should be assigned. When a DBC packet is transmitted (or detected) on the PLC medium 120, the transmission cost of the DBC packet can be added to the transmission cost associated with the bin to which the DBC packet is assigned. When a bin boundary 368 is reached the transmission cost associated with the oldest bin is subtracted from the previous transmission cost S, and the transmission cost associated with the current bin is added to the previous transmission cost S. In other words, when the time interval allocated for the current bin 362 expires (in this case, after the 5 ms interval that constitutes the current bin 362 expires), the predetermined time interval 310 is shifted ahead by 5 ms. Thus, the bin 352 is no longer part of the predetermined time interval 310 and, therefore, should not be considered in determining whether a pending DBC packet can be transmitted. In this example, after the bin boundary 368 of the current bin 362 is reached, the transmission cost associated with the bin 352 can be subtracted from the previous transmission cost S, and the transmission cost associated with the bin 362 can be added to the previous transmission cost S to yield a new value of the previous transmission cost (S'). Bin 370 can then be designated as the current bin, the transmission cost associated with the current bin 370 can be initialized to zero, and the transmission cost associated with the current bin 370 can be updated as DBC packets are transmitted/detected in the 5 ms time interval that corresponds to the current bin 370.

It is noted that in some implementations, the bin boundaries maintained by each of the DBC powerline devices 102, 104, and 108 may be synchronized. In other implementations, however, the bin boundaries maintained by the DBC powerline devices 102, 104, and 108 need not be synchronized. It is also noted that the bin size and the number of bins over which transmission costs associated with the DBC packet are combined may be static or dynamic and may be determined by the requirements of the system in which they are used. In one example, the DBC powerline devices 102, 104, and 108 may maintain relatively large sized bins to minimize processing. In another example, the DBC powerline devices 102, 104, and 108 may combine DBC packet costs over a small number of bins to minimize storage and computation overhead.

FIG. 4 is an example sequence diagram illustrating transmission of packets using a distributed bandwidth control protocol. FIG. 4 depicts two DBC devices 402 and 412. The DBC devices 402 and 412 can be Green PHY powerline devices or other suitable devices configured for distributed bandwidth control. The DBC device 402 maintains a timer (not shown) that indicates logical bin boundaries 408A-408J. Likewise, the DBC device 412 also maintains a timer that indicates its logical bin boundaries 418A-418J. Although the DBC devices 402 and 412 maintain the same bin interval (i.e., the length of the bins maintained at the DBC devices 402 and 412 is the same), the bin boundaries are not synchronized. In FIG. 4, the bin boundaries maintained the DBC device 412 lag the bin boundaries maintained by the DBC device 402 by a fixed delay.

At stage A, the DBC device 402 generates and transmits a DBC packet 404 without any delay. The DBC packet 404 is transmitted within a first bin bounded by bin boundaries 408A and 408B. The DBC device 402 can transmit the DBC packet 404 without any delay because the bandwidth allocated for DBC device communication is not exhausted and transmitting the DBC packet 404 will not cause the consumed bandwidth to exceed the bandwidth allocated for DBC device communication.

At stage B, the DBC devices 402 and 412 store information regarding bandwidth utilization and the transmitted DBC packet 404. For example, the DBC devices 402 and 412 can store a transmission cost associated with the DBC packet 404, a current medium utilization, and/or the bandwidth available for subsequent DBC communication.

At stage C, the DBC device 412 generates and transmits a DBC packet 414 without any delay because the allocated bandwidth for DBC device communication is not exhausted. The DBC packet 414 is transmitted within a third bin (of the DBC device 412) bounded by bin boundaries 418C and 418D. As described above, prior to transmitting the DBC packet 414, the DBC device 412 can determine whether transmitting the DBC packet 414 will cause the consumed bandwidth to exceed the predefined maximum bandwidth utilization allocated for DBC device communication based on stored bandwidth utilization information (determined at stage B). At stage C, the DBC device 412 transmits the DBC packet 414 without any delay on determining that the bandwidth allocated for DBC device communication is not exhausted and that transmitting the DBC packet 414 will not cause the consumed bandwidth to exceed the allocated bandwidth. After the DBC packet 414 is transmitted, the DBC devices 402 and 412 can update the information regarding bandwidth utilization and can store information regarding the transmitted DBC packet 414.

At stage D, the DBC devices 402 and 412 determine that bandwidth allocated for DBC device communication is exhausted. For example, the DBC devices 402 and 412 can determine that the transmission time associated with the DBC packet 404 and 414 is equal to (or almost equal to) the threshold transmission time allocated for DBC device communication.

At stage E, the DBC device 402 generates a DBC packet 406 but transmission of the DBC packet 406 is delayed until bandwidth is available. Because the DBC device 402 generates the DBC packet 406 after it is determined that the bandwidth allocated for DBC device communication is exhausted, the DBC device 402 cannot transmit the DBC packet 406 without violating DBC protocol constraints (e.g., threshold transmission time allocated for DBC device communication, maximum bandwidth utilization allocated for DBC device communication, etc.). The DBC device 402 can temporarily suspend transmission of the DBC packet 406 and can wait until sufficient bandwidth is available for transmitting the DBC packet 406 to ensure that the consumed bandwidth does not exceed the bandwidth allocated for DBC device communication.

At stage F, the DBC device 412 receives the DBC packet 406 transmitted by the DBC device 402. In other words, at stage F, the DBC device 402 determines that sufficient bandwidth is available for transmitting the DBC packet 406 to the DBC device 412. Consequently, the DBC device 402 transmits the previously delayed DBC packet 406. The DBC device 412 receives (and subsequently processes) the DBC packet 406.

In some implementations, rather than determining whether transmitting a pending DBC packet will cause resource utilization (e.g., bandwidth, transmission time, etc.) to exceed the corresponding threshold resource utilization allocated for DBC communication, the techniques for distributed bandwidth control can be implemented using a "pay in arrears" approach. As will be further described with reference to FIG. 5 and FIG. 6, the "pay in arrears" approach can enable DBC devices to compete equally (or on a priority basis) regardless of the cost of the pending DBC packet and then forbid further transmission until a delay period has elapsed.

Figure 5:
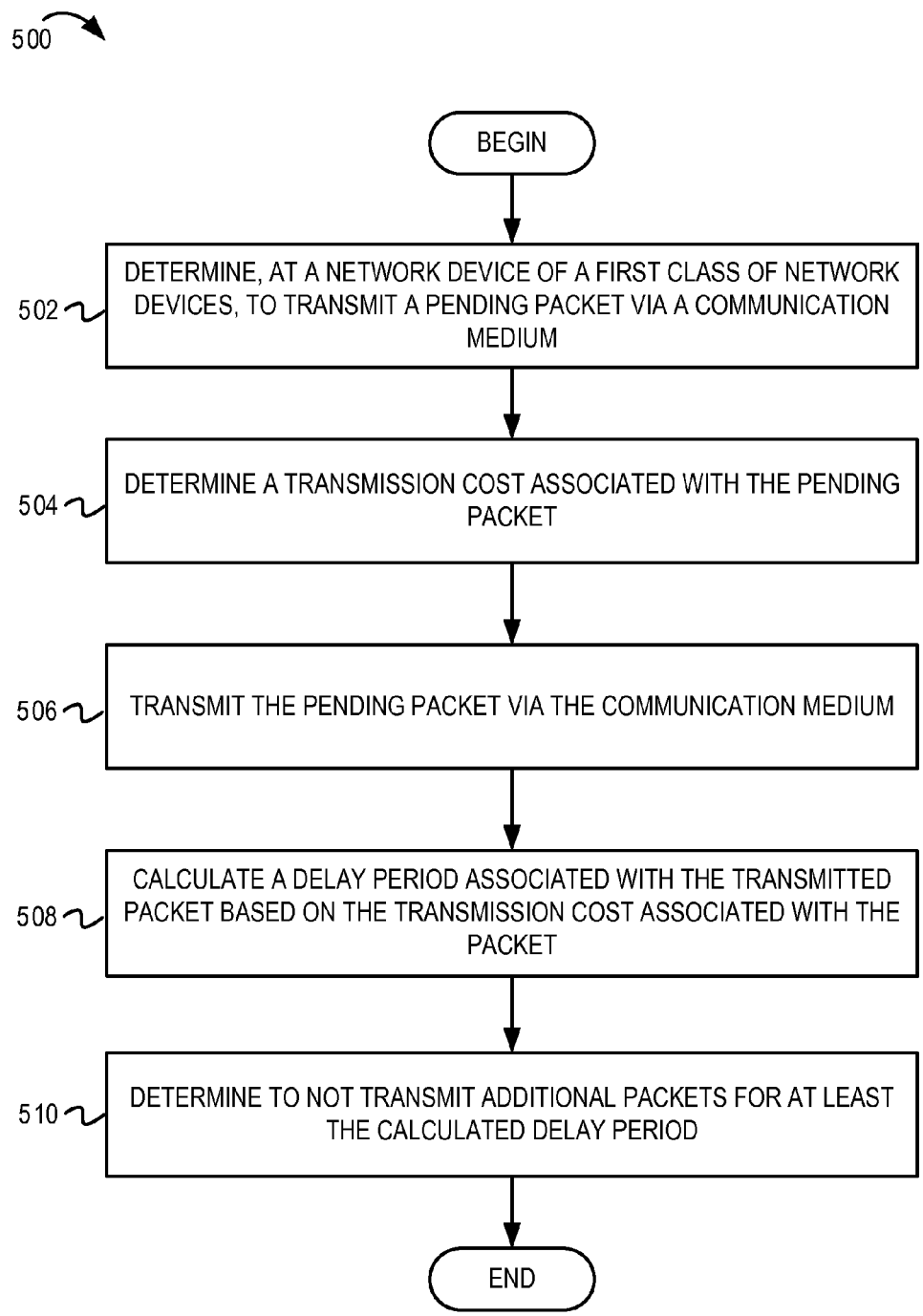
FIG. 5 is a flow diagram illustrating example operations of a delay-based distributed bandwidth control protocol.

FIG. 5 is a flow diagram 500 illustrating example operations of a delay-based distributed bandwidth control protocol. The flow 500 begins at block 502.

At block 502, it is determined, at a network device of a first class of network devices, to transmit a pending packet via a communication medium. For example, with reference to FIG. 1, the DBC powerline device 102 can determine to transmit a pending DBC packet via the PLC medium 120. The flow continues at block 504.

At block 504, a transmission cost associated with the pending packet is determined. For example, the bandwidth control unit 114 can analyze the pending DBC packet and can determine the transmission cost associated with the pending DBC packet. As described above, the bandwidth control unit 114 can use any suitable cost function to calculate the transmission cost associated with the pending DBC packet. For example, the cost function may be a transmission duration of the pending DBC packet. As another example, the cost function may be a weighted combination of one or more attributes (e.g., priority, type, duration of transmission, transmission rate, total payload size) of the pending DBC packet. As another example, a pre-determined cost (e.g., a cost of "2") may be assigned to the pending DBC packet (e.g., by an application that generated the DBC packet). The flow continues at block 506.

At block 506, the network device transmits the pending packet via the communication medium. For example, the transceiver unit 110 can transmit (based on an indication from the bandwidth control unit 114) the pending DBC packet via the PLC medium 120. The bandwidth control unit 114 may not analyze the transmission cost associated with the pending DBC packet and the cost of previously transmitted DBC packets (as described above with reference to FIGS. 1-4) to determine whether to transmit the pending DBC packet. The DBC powerline device 102 can contend for the PLC medium 120 with the non-DBC powerline device 106, with other DBC powerline devices 104, 108, etc. On gaining control of the PLC medium 120, the DBC powerline device 102 can transmit the pending DBC packet. The flow continues at block 508.

At block 508, a delay period associated with the transmitted packet is calculated based on the transmission cost associated with the packet. For example, the bandwidth control unit 114 can calculate the delay period associated with the DBC packet (transmitted at block 506) based on the transmission cost associated with the DBC packet. The bandwidth control unit 114 can calculate the delay period (R) for the transmitted DBC packet based on the transmission cost (C) associated with the DBC packet (calculated at block 504). The bandwidth control unit 114 can calculate the delay period for the transmitted DBC packet so that the transmitted DBC packet consumes no more than a maximum fractional bandwidth utilization allocated for DBC device communication (F) over a time period (T) that is associated with the transmission cost (C). In one implementation, if the transmission cost is the transmission duration, the bandwidth control unit 114 can first calculate the time period T over which to analyze DBC transmissions for maintaining the maximum fractional bandwidth utilization allocated for DBC device communication F. With reference to Eq. 1a, the time period T can be calculated so that the transmission cost C (i.e., the transmission time of the DBC packet) is a fraction F of the time period T. For example, if the maximum fractional bandwidth utilization for DBC communication is 0.07 (i.e., a 7% bandwidth utilization allocated for DBC communication), a DBC packet that requires 700 microseconds for transmission, the time period can be calculated to be 10 ms (i.e., 700 microseconds/0.07). Next, as depicted with reference to Eq. 1b, the delay period R can be calculated by subtracting the transmission cost C from the time period T. With reference to the above example, where the transmission cost associated with the DBC packet is 700 microseconds and the time period is calculated to be 10 ms, the delay period R associated with the DBC packet can be computed to be 9.3 ms (i.e., 10 ms−700 microseconds). Eq. 1a and Eq. 1b can be combined to yield Eq. 2, which depicts the delay period R associated with the DBC packet as a function of the maximum fractional bandwidth utilization allocated for DBC device communication F and the transmission cost C associated with the DBC packet. The flow continues at block 510.

$$C = F*T \qquad \text{Eq. 1a}$$

$$T = C + R \qquad \text{Eq. 1b}$$

$$\text{Delay period } (R) = C\left(\frac{1-F}{F}\right) \qquad \text{Eq. 2}$$

At block 510, the network device determines to not transmit additional packets for at least the calculated delay period. For example, the bandwidth control unit 114 can indicate that additional DBC packets should not be transmitted for at least the calculated delay period. With reference to the above example, where the delay period associated with the DBC packet is calculated to be 9.3 ms, the DBC powerline device 102 can wait for a time period of 9.3 ms before attempting to transmit another pending DBC packet. Waiting for the delay period after transmitting (or detecting) the DBC packet can enable the DBC powerline devices 102, 104, and 108 to maintain the threshold transmission cost allocated for DBC device communication without analyzing previous DBC transmissions (as described above with reference to FIGS. 2-4). From block 510, the flow ends.

It is noted that, in some implementations, the DBC powerline devices 102, 104, and 108 need not wait for the delay period after each DBC packet is transmitted before transmitting the next DBC packet. Instead, the DBC powerline devices 102, 104, and 108 can wait for a cumulative delay period after successively transmitting multiple DBC packets, as will be described with reference to FIG. 6.

Figure 6:
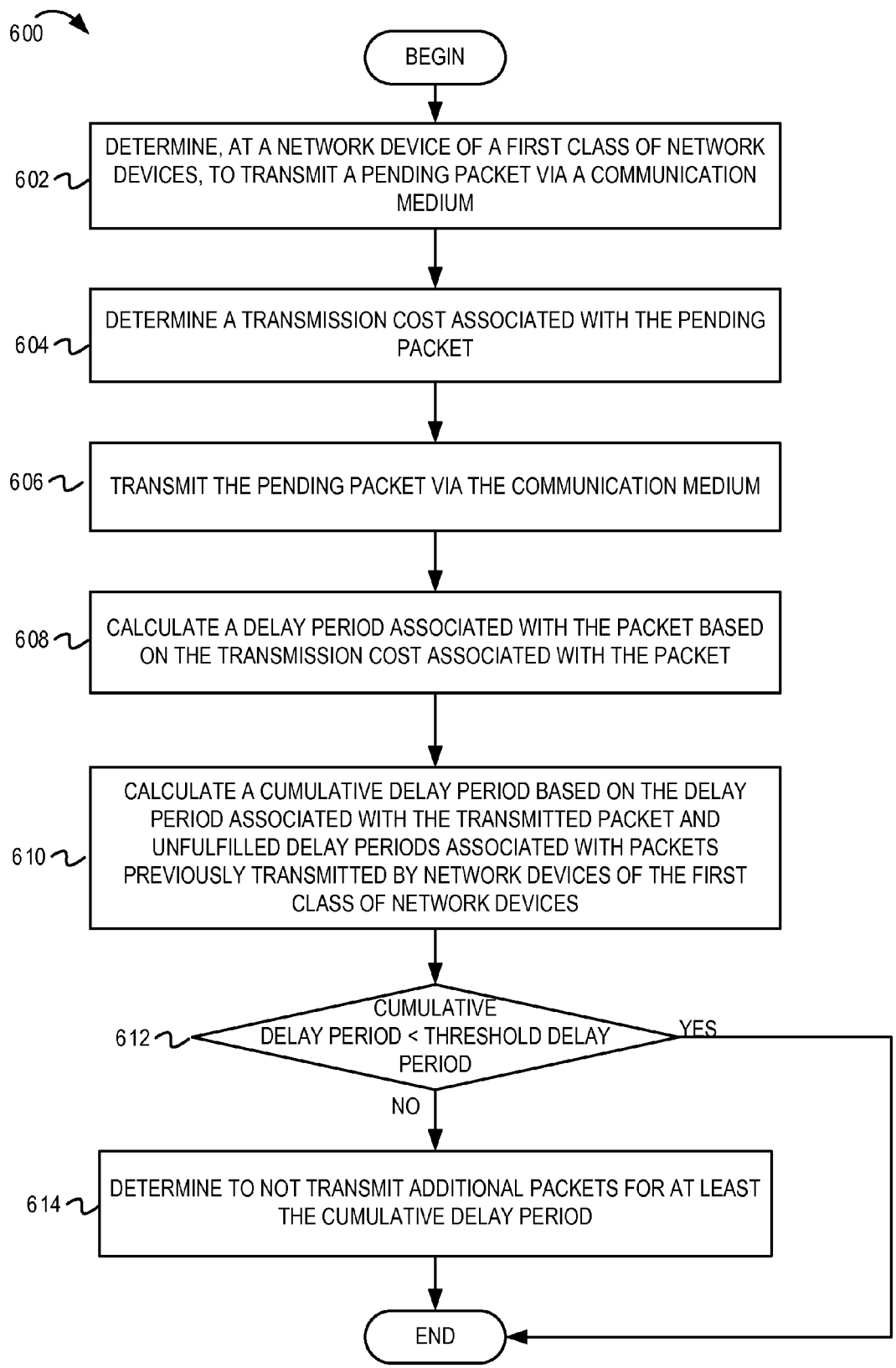
FIG. 6 is a flow diagram illustrating example operations of a second embodiment of the delay-based distributed bandwidth control protocol.

FIG. 6 is a flow diagram 600 illustrating example operations of a second embodiment of the delay-based distributed bandwidth control protocol. The flow 600 begins at block 602.

At block 602, it is determined, at a network device of a first class of network devices, to transmit a pending packet via a communication medium. For example, with reference to FIG. 1, the DBC powerline device 102 can determine to transmit a pending DBC packet via the PLC medium 120. The flow continues at block 604.

At block 604, a transmission cost associated with the pending packet is determined. As described above with reference to FIG. 5, in one example, the bandwidth control unit 114 can determine the transmission cost associated with the pending DBC packet. The flow continues at block 606.

At block 606, the network device transmits the pending packet via the communication medium. For example, the transceiver unit 110 can transmit the pending DBC packet via the PLC medium 120. The bandwidth control unit 114 may not analyze the transmission cost associated with the pending DBC packet and the cost of previously transmitted DBC packets (as described above with reference to FIGS. 1-4) to determine whether to transmit the pending DBC packet. The DBC powerline device 102 can contend for the PLC medium 120 and can transmit the pending DBC packet on gaining control of the PLC medium 120. The flow continues at block 608.

At block 608, a delay period associated with the transmitted packet is calculated based on the transmission cost associated with the packet. For example, the bandwidth control unit 114 can calculate the delay period associated with the transmitted DBC packet based on the transmission cost associated with the DBC packet. In one implementation, the delay period associated with the DBC packet can be calculated in accordance with Eq. 2. In other implementations, any suitable techniques can be employed for calculating the delay period associated with the DBC packet. The flow continues at block 610.

At block 610, a cumulative delay period is calculated based on the delay period associated with the transmitted packet and unfulfilled delay periods associated with packets previously transmitted by network devices of the first class of network devices. For example, the bandwidth control unit 114 can calculate the cumulative delay period based on the delay period associated with the DBC packet (transmitted at block 606) and unfulfilled delay periods associated with previously transmitted DBC packets. The bandwidth control unit 114 can keep track of DBC packets that were transmitted by the DBC powerline device 102 and by the other DBC powerline devices 104 and 108. The bandwidth control unit 114 can also keep track of delay periods (that were not observed or unfulfilled delay periods) associated with the transmitted/detected DBC packets. As DBC packets are transmitted (or detected) on the PLC medium 120, the bandwidth control unit 114 can update the cumulative delay period. This can enable the DBC powerline devices 102, 104, and 108 to transmit multiple DBC packets without waiting for a delay period after each transmission (as described above in FIG. 5). Instead, in accordance with the operations described with reference to FIG. 6, the maximum bandwidth utilization allocated for DBC device communication (e.g., 7%) can still be achieved by observing the cumulative delay period as will be described below. The flow continues at block 612.

At block 612, it is determined whether the cumulative delay period is less than a threshold delay period. For example, the bandwidth control unit 114 can compare the cumulative delay period against the threshold delay period. In one implementation, the threshold delay period can be calculated based on a threshold transmission duration allocated for DBC device communication or based on a threshold bandwidth utilization allocated for DBC device communication. In another implementation, the threshold delay period can be calculated using any suitable techniques, while ensuring that the PLC medium 120 is not dominated by the DBC device communication for an excessive period of time. If it is determined that the cumulative delay period is less than threshold delay period, the DBC powerline device 102 can continue to transmit additional DBC packets without observing the delay period and the flow ends. However, if it is determined that the cumulative delay period is not less than threshold delay period, the flow continues at block 614.

At block 614, the network device determines to not transmit additional packets for at least the cumulative delay period. From block 614, the flow ends.

Although not depicted in FIG. 6, in some implementations, the DBC powerline device 102 can determine whether to transmit the pending DBC packet based on comparing the cumulative delay period against the threshold delay period. For example, the DBC powerline device 102 can calculate the delay period associated with the pending DBC packet. The DBC powerline device 102 can then calculate the cumulative delay period based on the unfulfilled delay periods associated with previously transmitted DBC packets and based on the delay period associated with the pending DBC packet. The DBC powerline device 102 can compare the cumulative delay period against the threshold delay period. If the cumulative delay period exceeds the threshold delay period, the DBC powerline device 102 can determine not to transmit the pending DBC packet and to instead observe the unfulfilled delay periods associated with previously transmitted DBC packets. If the cumulative delay period does not exceed the threshold delay period, the DBC powerline device 102 can determine to transmit the pending DBC packet.

It is noted that although FIG. 5 and FIG. 6 describe the DBC powerline device 102 that transmitted the DBC packet (at block 506 and at block 606) determining to not transmit subsequent DBC packets for at least the calculated delay period, embodiments are not so limited. In some implementations, all other DBC powerline devices 104 and 108 on the PLC medium 120 can execute operations described with reference to blocks 508 and 510 of FIG. 5 (and blocks 608-614 of FIG. 6) to determine the delay period associated with the transmitted DBC packet(s). For example, the DBC powerline devices 104 and 108 could detect the DBC packet transmitted by the DBC powerline device 102. The DBC powerline devices 104 and 108 can determine the cost associated with the detected DBC packet and can calculate the delay period associated with the detected DBC packet. All the DBC powerline devices 102, 104 and 106 can then prevent transmission of DBC packets for the calculated delay period.

In some implementations, a hidden node scenario may arise on the PLC medium 120 (or other communication medium, where network devices implement the DBC protocol). In the hidden node scenario, a first network device and a second network device may not detect each other (i.e., may be "hidden" from each other). A third network device, however, may detect both the first network device and the second network device. The first network device and the second network device may alternate transmissions so that they adhere to the DBC protocol constraints (e.g., by limiting transmissions to a threshold transmission time or a threshold bandwidth utilization). However, because the third network device detects the first and the second network devices, the third network device may not be able to transmit a DBC packet without violating the DBC protocol constraints. In other words, the third network device may be starved by the first network device and the second network device. In some implementations, as will be described with reference to FIG. 7, the starved network device may transmit pending DBC packets irrespective of the DBC protocol constraints in some situations.

Figure 7:
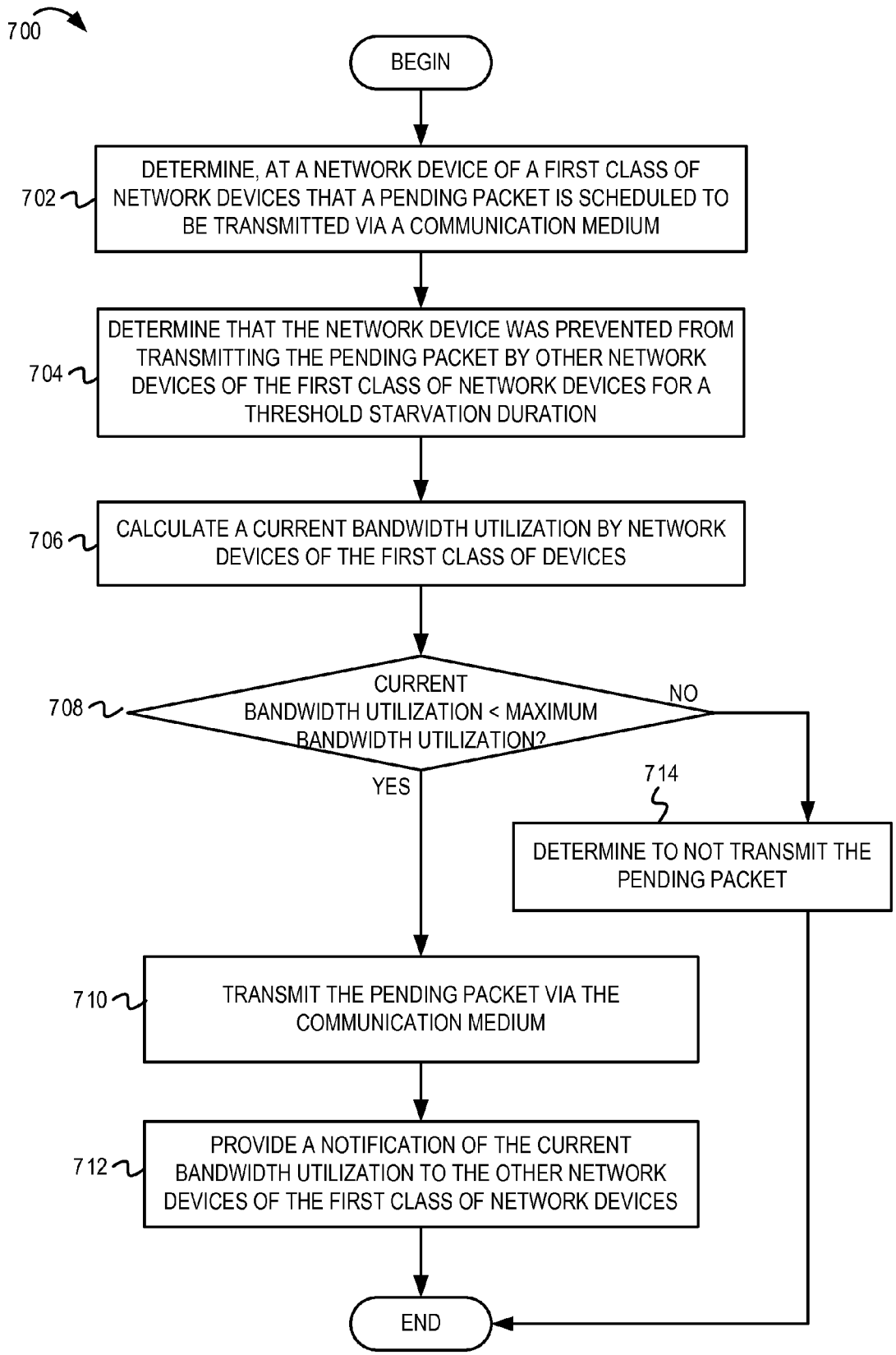
FIG. 7 is a flow diagram illustrating example operations for counteracting network device starvation.

FIG. 7 is a flow diagram 700 illustrating example operations for counteracting network device starvation. The flow 700 begins at block 702.

At block 702, it is determined, at a network device of a first class of network devices, that a pending packet is scheduled to be transmitted via a communication medium. For example, with reference to FIG. 1, the DBC powerline device 102 can determine that a pending DBC packet is scheduled to be transmitted via the PLC medium 120. The flow continues at block 704.

At block 704, it is determined that the network device was prevented from transmitting the pending packet by other network devices of the first class of network devices for a threshold starvation duration. For example, the bandwidth control unit 114 can determined that the DBC powerline device 102 was prevented from transmitting the pending DBC packet by other DBC powerline devices 104 and 108 for at least the threshold starvation duration. In some implementations, on determining that the pending DBC packet should be transmitted, the bandwidth control unit 114 can start a timer to record the time for which the DBC powerline device 102 is prevented from transmitting the pending DBC packet. The bandwidth control unit 114 can also determine whether the DBC powerline device 102 was prevented from transmitting the pending DBC packet because the DBC powerline device could not contend for the PLC medium 120. In some implementations, the threshold starvation duration may be dependent on one or more of a priority of the pending DBC packet, a transmission cost of the pending DBC packet, a number of DBC powerline devices on the PLC medium 120, amount of non-DBC traffic, a threshold transmission cost allocated for DBC communication, a maximum allowable transmission cost allocated for DBC communication (if different from the threshold transmission cost), and/or other criteria. For example, if the pending DBC packet has a high priority, the bandwidth control unit 114 can determine whether the pending DBC packet was starved for a first threshold starvation duration. If the if the pending DBC packet has a low priority, the bandwidth control unit 114 can determine whether the pending DBC packet was starved for a second threshold starvation duration. The flow continues at block 706.

At block 706, a current bandwidth utilization by network devices of the first class of network devices is calculated ("current bandwidth utilization"). For example, the bandwidth control unit 114 can calculate the current bandwidth utilization of the PLC medium 120 by DBC powerline devices based on knowledge of the DBC packets detected during a predetermined time interval. As described above with reference to FIGS. 2-4, the bandwidth control unit 114 can calculate an aggregate DBC transmission time for which DBC packets were transmitted (e.g., by all the DBC powerline devices 102, 104, and 108) in the predetermined time interval. For example, based on the number of DBC packets detected in the predetermined time interval and the transmission time associated with each of the detected DBC packets, the bandwidth control unit 114 may determine that the current bandwidth utilization by DBC powerline devices is 10%. The flow continues at block 708.

At block 708, it is determined whether the current bandwidth utilization is greater than a maximum bandwidth utilization allocated for network devices of the first class of network devices. For example, the bandwidth control unit 114 can determine whether the current bandwidth utilization of the PLC medium 120 by DBC communication is greater than the maximum bandwidth utilization allocated for DBC device communication. The maximum bandwidth utilization for DBC device communication may be pre-allocated and may depend on the number of non-DBC powerline devices on the PLC medium 120, the priority of non-DBC transmissions relative to the priority of the DBC device communication, etc. For example, if Green PHY powerline devices are configured for distributed bandwidth control, the DBC Green PHY powerline devices may be configured for a maximum bandwidth utilization of 15%. With reference to the above example, where the current bandwidth utilization by DBC powerline devices is determined to be 10%, the bandwidth control unit 114 can determine that the current bandwidth utilization (e.g., 10%) is less than the maximum bandwidth utilization allocated for DBC device communication (e.g., 15%). In one implementation, the maximum bandwidth utilization can be greater than the threshold bandwidth utilization described above with reference to FIGS. 1-6. For example, the threshold bandwidth utilization can be a fraction of the maximum bandwidth utilization. Thus, if the maximum bandwidth utilization allocated for DBC device communication is 15%, the threshold bandwidth utilization that DBC powerline devices use to determine whether to transmit a pending DBC packet may be approximately 50% of the maximum bandwidth utilization (e.g., 7% threshold bandwidth utilization). In another implementation, the threshold bandwidth utilization may be equal to the maximum bandwidth utilization. If it is determined that the current bandwidth utilization is greater than the maximum bandwidth utilization allocated for communication by network devices of the first class of network devices, the flow continues at block 710. Otherwise, the flow continues at block 714.

At block 710, the network device transmits the pending packet via the communication medium. For example, the transceiver unit 110 can transmit (based on an indication from the bandwidth control unit 114) the pending DBC packet via the PLC medium 120. For example, the DBC powerline device 102 may have been waiting to transmit a pending DBC packet with cost C, may have been starved by the other DBC powerline devices 104 and 108 (for at least the threshold starvation duration), and may calculate a current bandwidth utilization by all DBC powerline devices (L) that is less than the maximum bandwidth utilization (U). In this example, because L<U, the DBC powerline device 102 may be permitted to transmit the pending DBC packet of cost C, even though transmitting the pending DBC packet may exceed other threshold costs (e.g., threshold bandwidth utilization, threshold transmission time) allocated for DBC device communication. In other words, the maximum bandwidth utilization (U) can enable DBC powerline devices that are starved to transmit pending DBC packets even though transmitting the pending DBC packet may exceed the other threshold costs. The flow continues at block 712.

At block 712, a notification of the current bandwidth utilization is provided to the other network devices of the first class of network device. For example, the DBC powerline device 102 can provide the notification of the current bandwidth utilization by all the DBC powerline devices to the DBC powerline devices 104 and 108. For example, in a hidden node scenario, if the DBC powerline device 102 is surrounded by two DBC powerline devices 104 and 108 hidden to each other, the hidden DBC powerline devices 104 and 108 may observe only ½ the bandwidth utilization observed by the DBC powerline device 102. Therefore, the DBC powerline device 102 may transmit information to the DBC powerline devices 104 and 108 as a measure of the effective number of hidden DBC powerline devices or as a measure of how oversubscribed the communication medium appears to be to the DBC powerline device 102. In one implementation, the DBC powerline device 102 may provide an indication of the number of hidden DBC powerline devices observed, a number of hidden device clusters (e.g., groups of DBC powerline devices) observed, the current bandwidth utilization, the time interval for which the DBC powerline device 102 has been waiting to transmit the pending DBC packet, and/or other information.

In one implementation, each of the DBC powerline devices 102, 104, and 108 can transmit an indication of the observed bandwidth utilization to the other DBC powerline devices, so that each of the DBC powerline devices can construct a network map and be aware of all the DBC powerline devices. For example, the DBC powerline device 102 may indicate a bandwidth utilization of 14%, the DBC powerline device 104 may indicate a bandwidth utilization of 7%, and the DBC powerline device 108 may indicate a bandwidth utilization of 7%. Based on the network map, the DBC powerline devices 104 and 108 can identify a hidden node scenario and can accordingly throttle their transmissions. In another implementation, the DBC powerline device 102 can determine that the DBC powerline devices 104 and 108 are hidden from each other and can direct the DBC powerline devices 104 and 108 to reduce their transmissions.

On receiving this information, the DBC powerline devices 104 and 108 can scale their transmissions to account for the hidden DBC powerline devices. For example, using the bin-based DBC protocol described in FIGS. 2-4, the DBC powerline device 102 may calculate a 5 ms bandwidth utilization by DBC powerline devices per 30 ms (i.e., 17% bandwidth utilization), when the threshold bandwidth utilization should be 2 ms per 30 ms (i.e., 7% bandwidth utilization). On receiving this information from the DBC powerline device 102, the DBC powerline device 104 can increment its analyzed bins by 2.5 (i.e., 5 ms/2 ms) times the original number of bins (e.g., 6 bins) and can analyze DBC transmissions over 15 bins (e.g., 6×5/2=15 bins). As another example, using the delay period DBC protocol described in FIG. 5-6, if the delay period for a set of transmissions would ordinarily be R, then if H hidden DBC powerline devices are observed, the delay period may be increased to R'=HR. It is noted that, in some implementation, the notification of the current bandwidth utilization could be included as part of the transmission of the pending DBC packet to minimize overhead and resource consumption. From block 712, the flow ends.

At block 714, the network device determines to not transmit the pending packet. For example, the bandwidth control unit 114 can determine to not transmit the pending DBC packet. The flow 700 moves from block 708 to block 714 on determining that the DBC powerline device 102 was starved by the other DBC powerline devices 104 and 108 for the threshold starvation duration and that the current bandwidth utilization exceeded the maximum bandwidth utilization allocated for DBC device communication. In some implementations, although the DBC powerline device 102 may not transmit the pending DBC packet, the DBC powerline device 102 may provide an indication of the current bandwidth utilization to the other DBC powerline device 104 and 108 (as described above in block 712). From block 714, the flow ends.

It is noted that in some implementations, the DBC powerline device 102 may not transmit the notification of the current bandwidth utilization to the other DBC powerline devices 104 and 108. Instead, the other DBC powerline devices 104 and 108 may detect the DBC packet transmitted by the DBC powerline device 102 and may automatically decrease their transmissions to comply with DBC protocol constraints (e.g., the threshold transmission time, the threshold bandwidth utilization, etc.). In some implementations, the DBC powerline device 102 may be limited in how often it can execute the operations described with reference to FIG. 7. For example, if the threshold starvation duration is 500 ms, the DBC powerline device 102 may only be allowed to transmit DBC packets (irrespective of DBC protocol constraints) once every 10 seconds. Furthermore, in some implementations, on determining that the current bandwidth utilization is less than the maximum bandwidth utilization (at block 708), the bandwidth control unit 114 may determine whether the DBC powerline device 102 should be permitted to transmit the pending DBC packet. Permission to transmit the pending DBC packet irrespective of the DBC protocol constraints may depend on the number of non-DBC powerline devices on the PLC medium 120, whether the non-DBC powerline devices are currently communicating via the PLC medium 120, and the current bandwidth utilization of the PLC medium 120 by the non-DBC powerline devices.

It is also noted that in some implementations, the bandwidth control unit 114 may periodically determine whether the DBC powerline device 102 is in a hidden node scenario and/or whether the DBC powerline device 102 is being starved by the other DBC powerline devices 104 and 108. If the bandwidth control unit 114 determines that the DBC powerline device 102 is being starved, the bandwidth control unit 114 can determine (as described with reference to FIG. 7) whether to transmit pending DBC packets irrespective of the DBC protocol constraints. If the bandwidth control unit 114 determines that the DBC powerline device 102 was not starved for the threshold starvation duration, the bandwidth control unit 114 may wait until the threshold starvation duration is exceeded and may continue to determine whether the pending DBC packet can be transmitted. The bandwidth control unit 114 can execute operations described with reference to FIG. 2 to determine whether the DBC powerline device 102 can transmit the pending DBC packet.

Figure 8:
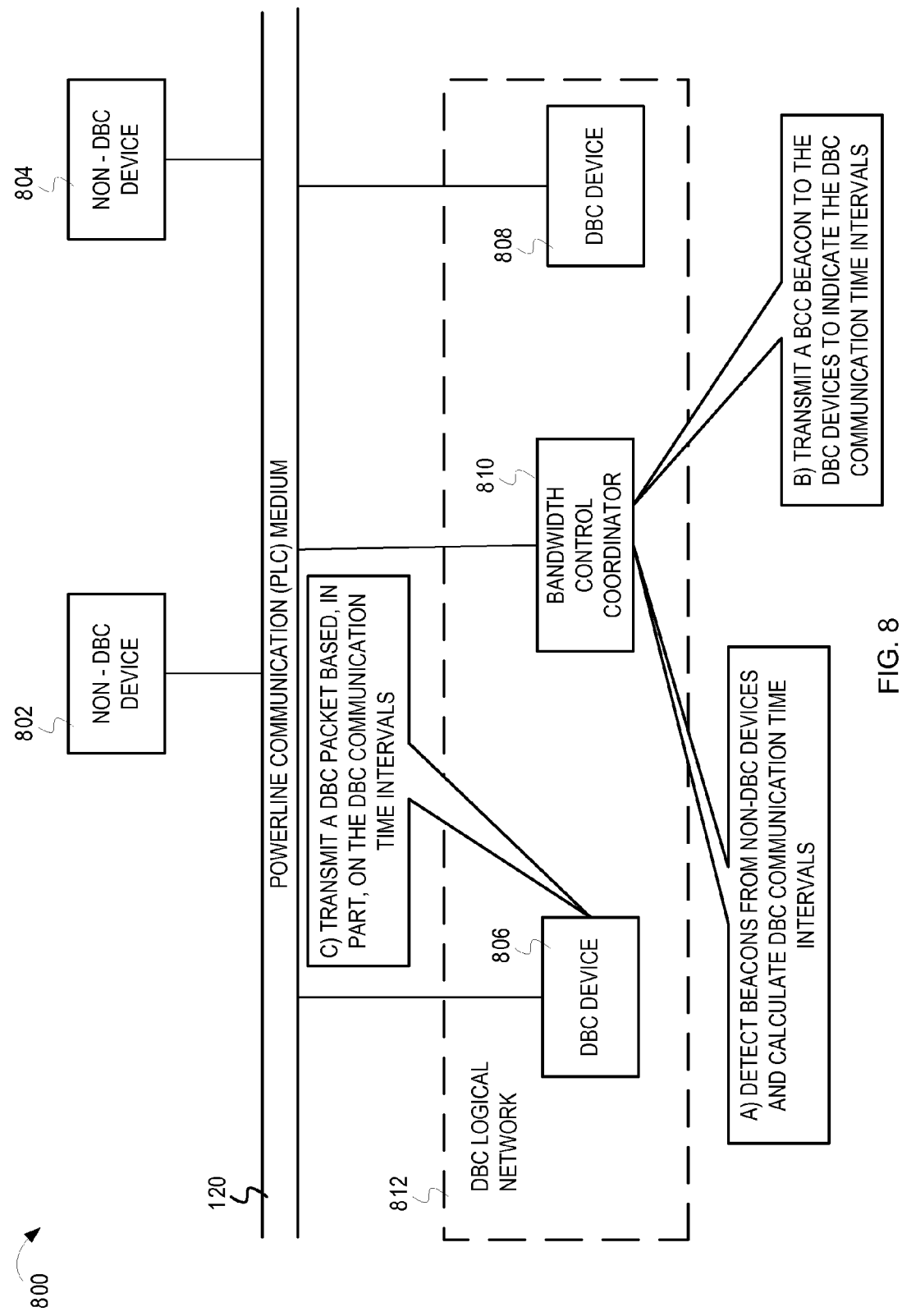
FIG. 8 is an example conceptual diagram illustrating a centralized bandwidth control mechanism for a class of bandwidth-controlled devices.

FIG. 8 is an example conceptual diagram illustrating a centralized bandwidth control mechanism for a class of bandwidth-controlled devices. FIG. 8 depicts a PLC network 800 comprising non-DBC powerline devices 802 and 804, DBC powerline devices 806 and 808, and a bandwidth control coordinator (BCC) 810. The non-DBC powerline devices 802 and 804, the DBC powerline devices 806 and 808, and the bandwidth control coordinator 810 communicate via the PLC medium 120. In FIG. 8, the DBC powerline devices 806 and 808 are organized into a logical group (i.e., a DBC logical network 812) along with the bandwidth control coordinator 810. The bandwidth control coordinator 810 can comprise greater communication capabilities as compared to the DBC powerline devices 806 and 806. The bandwidth control coordinator 810 can also provide security keys, assign device identifiers, and coordinate communications of the DBC powerline devices 806 and 808.

At stage A, the bandwidth control coordinator 810 detects beacons from the non-DBC powerline devices 802 and 804 and calculates a time interval during which the DBC powerline devices 806 and 808 can communicate. The bandwidth control coordinator 810 can determine access control allocation information (e.g., time intervals during which non-DBC transmissions are scheduled) from the beacons transmitted by the non-DBC powerline devices 802 and 804. Based on the access control allocation information, the bandwidth control coordinator 810 can determine time intervals during which the non-DBC powerline devices will not be communicating. Consequently, the bandwidth control coordinator 810 can determine the time intervals during which the DBC powerline devices 806 and 808 may be permitted to transmit ("DBC communication time interval") without interfering with the non-DBC powerline devices 802 and 804. In some implementations, if transmission schedule(s) of the non-DBC powerline devices and/or other neighbor interfering networks can vary more rapidly than the beacon intervals of the bandwidth control coordinator 810, the bandwidth control coordinator 810 may be conservative in calculating the DBC communication time intervals. In some implementations, the bandwidth control coordinator 810 could negotiate with other bandwidth control coordinators associated with other DBC logical networks to determine the DBC communication time intervals for the DBC logical network 812.

Furthermore, while calculating the DBC communication time intervals, the bandwidth control coordinator 810 can also take the transmission time and bandwidth allocated for DBC device communication into consideration to enable maximum utilization of the bandwidth allocated for DBC device communication. In some implementations, while calculating the DBC communication time intervals, the bandwidth control coordinator 810 can determine whether the DBC powerline devices waited for a restricted time interval (e.g., time interval not allocated for DBC communication) to end before transmitting the DBC packet. If so, the time interval that the DBC powerline devices spent waiting can be deducted from the delay period to be observed by the DBC powerline devices after DBC packet transmission.

At stage B, the bandwidth control coordinator 810 transmits a BCC beacon to the DBC powerline devices 806 and 808 to indicate the DBC communication time intervals. The DBC communication time intervals can indicate one or more time periods during which the DBC powerline devices 806 and 808 can transmit DBC packets without interfering with the non-DBC powerline devices 802 and 804, and with other communication networks. The BCC beacon can also comprise other network management information (e.g., to enable the DBC powerline devices to synchronize their local clocks to a Network Time Base (NTB)). In one implementation, the bandwidth control coordinator 810 can periodically transmit BCC beacons to provide the DBC powerline devices 806 and 808 with the network management information and updated DBC communication time intervals. In another implementation, the bandwidth control coordinator 810 may transmit the BCC beacons infrequently (e.g., when information is available) and not in accordance with a predetermined beacon interval.

At stage C, the DBC powerline device 806 transmits a pending DBC packet based, in part, on the DBC communication time intervals indicated in the BCC beacon.

It should be understood that the depicted diagrams (FIGS. 1-8) are examples meant to aid in understanding embodiments and should not be used to limit embodiments or limit scope of the claims. Embodiments may perform additional operations, fewer operations, operations in a different order, operations in parallel, and some operations differently. For example, although not described with reference to FIGS. 1-7, various techniques can be employed to determine whether network devices of a particular device class should implement the distributed bandwidth control protocol described herein. In one implementation, the DBC protocol may be executed only when transmissions from non-DBC devices are detected. In another implementation, the DBC devices may execute the DBC protocol irrespective of whether the non-DBC devices are detected. In another implementation, a DBC device that detects a non-DBC device may transmit a control message to other DBC devices to identify the detected non-DBC device and to indicate that the DBC protocol should be executed.

It is noted that although FIG. 1 describes operations for distributed bandwidth control being implemented by powerline communication devices for managing bandwidth utilization in a powerline communication medium, embodiments are not so limited. In other embodiments, various other wired and wireless network devices could implement the operations described above. For example, legacy WLAN devices could implement the operations described with reference to FIG. 1 to give non-legacy WLAN devices more time on the wireless communication medium. In other examples, a class of any suitable communication devices that are required to limit their consumption of communication medium resources to provide a higher percentage of the communication medium resources to another class of communication devices can be configured to implement the DBC protocol.

In some implementations, a source DBC powerline device 102 that has just transmitted a DBC packet may be required to wait longer to transmit another DBC packet as compared to other DBC powerline devices 104 and 108 that have not recently transmitted a DBC packet. This can ensure that the source DBC powerline device 102 does not dominate the PLC medium 120 for an extended period of time. As one example, the source DBC powerline device 102 may be required to wait an additional K bins or to analyze DBC transmissions over a longer time period to determine if the source DBC powerline device 102 can transmit another pending DBC packet (after transmitting a first pending DBC packet). As another example, the source DBC powerline device 102 may be required to wait for a longer delay period as compared to the other DBC powerline devices 104 and 108. If multiple DBC packets can be transmitted before a cumulative delay period begins, then each source DBC powerline device 102 that transmitted prior to the cumulative delay period may be required to wait for an additional delay period proportional to the number of DBC packets transmitted.

In some implementations, some types of DBC packets may be assigned a transmission cost of "0" or may not be taken into consideration when calculating the cumulative transmission cost (or current bandwidth utilization). For example, beacon messages transmitted for communication network management (or other such high priority transmissions) may not be taken into consideration while executing the DBC protocol. The beacon messages may be transmitted irrespective of whether the DBC protocol constraints will be violated by the transmission of the beacon messages. In some implementations, the DBC devices may be permitted to transmit DBC packets irrespective of the threshold transmission cost (or the threshold bandwidth utilization) if there are no non-DBC devices on the communication medium or if the non-DBC devices are currently not transmitting. For example, the DBC packets may always be assigned the lowest priority to enable the DBC devices to use excess bandwidth available, while ensuring that transmitting the DBC packets will not limit the bandwidth available for transmitting non-DBC packets. As another example, an adaptive DBC protocol may be implemented and the bandwidth allocated for DBC device communication may be increased if the bandwidth utilized by the non-DBC powerline devices falls below a minimum threshold. Likewise, the bandwidth allocated for DBC communication may be decreased if the bandwidth utilized by the DBC powerline devices falls below a minimum threshold and/or if the bandwidth utilized by the non-DBC powerline devices exceeds a maximum threshold. In another embodiment, if the DBC powerline devices use a CSMA channel for transmitting DBC packets, the DBC powerline devices may transmit their DBC packets even when the allocated bandwidth for DBC communication is exceeded with a less aggressive back-off mechanism to enable non-DBC powerline devices to easily gain control of the communication medium.

Although FIG. 7 describes operations for circumventing a hidden node scenario comprising only DBC devices, embodiments are not so limited. In some implementations, where a communication network comprises a combination of DBC devices and non-DBC devices, a hidden node scenario can result in the DBC devices consuming more than the threshold bandwidth allocated for DBC device communication. For example, if a non-DBC device is flanked by two DBC devices that are hidden from each other, then each of the DBC devices may consume the threshold bandwidth allocated for DBC device communication resulting in an effective bandwidth consumption that is twice the threshold bandwidth allocated for DBC device DBC communication. Such a scenario may be overcome by enabling communication between the DBC devices and the non-DBC devices. For example, the non-DBC device may transmit a message to request the DBC devices to reduce their bandwidth utilization by ½. As another example, the non-DBC device can transmit an indication of bandwidth utilization by the DBC devices. It is noted that various other techniques can be employed by starved devices (either DBC or non-DBC devices) to cause the hidden DBC devices to throttle their transmissions.

Lastly, although FIG. 8 describes the bandwidth control coordinator 810 managing the DBC logical network 812 comprising only DBC powerline devices 806 and 808, embodiments are not so limited. In some implementations, the DBC powerline devices 806 and 808 and the non-DBC powerline devices 802 and 804 may be part of a common logical network managed by the bandwidth control coordinator 810. The bandwidth control coordinator 810 may be either a DBC powerline device or a non-DBC powerline device. The bandwidth control coordinator 810 may restrict the DBC powerline devices 806 and 808 to communicating within DBC communication intervals and may restrict the non-DBC powerline devices 802 and 804 to communicating during non-DBC communication intervals. For example, the bandwidth control coordinator 810 may permit the DBC powerline devices 806 and 808 to contend for the PLC medium 120 during certain carrier sense medium access (CSMA) intervals, and preclude the DBC powerline devices 806 and 808 from contending for the PLC medium 120 during time division multiple access (TDMA) intervals.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
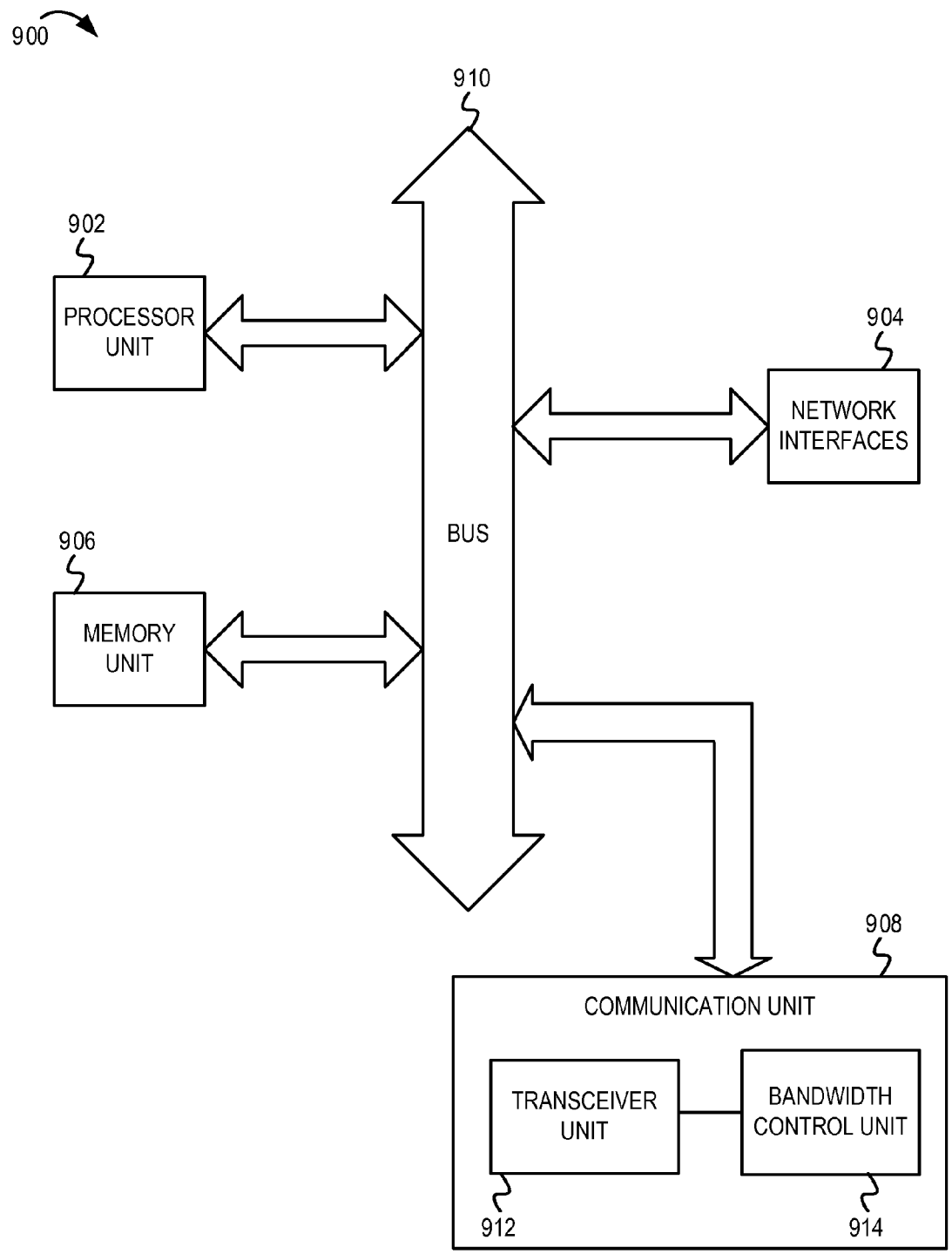
FIG. 9 is a block diagram of one embodiment of an electronic device including a mechanism for distributed bandwidth control in a communication network.

FIG. 9 is a block diagram of one embodiment of an electronic device 900 including a mechanism for distributed bandwidth control in a communication network. In some implementations, the electronic device 900 can be a powerline communication device configured for distributed bandwidth control. In another implementation, the electronic device 900 can be any suitable wired communication device (e.g., an Ethernet device) or wireless communication device (e.g., a WLAN device) configured for distributed bandwidth control. In another implementation, the electronic device 900 may be a laptop, a personal computer (PC), a netbook, a mobile phone, a personal digital assistant (PDA), a printer, or other suitable electronic system configured to communicate with other communication devices and to implement a distributed bandwidth control protocol. The electronic device 900 includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, InfiniBand®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.).

The electronic device 900 also includes a communication unit 908. The communication unit 908 comprises a transceiver 912 and a bandwidth control unit 914. The communication unit 908 can determine whether to transmit a pending packet based on a transmission cost of the pending packet, a threshold cost allocated for distributed bandwidth control (DBC) devices, and transmission costs of packets transmitted by other DBC devices in a predetermined time interval, as described above with reference to FIGS. 1-7. Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the memory unit 906, and the network interfaces 904 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, techniques for implementing a Distributed Bandwidth Control (DBC) mechanism as described herein may be implemented with facilities consistent with any hardware and/or software systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for controlling bandwidth comprising:
   determining, at a first network device of a class of network devices, a first transmission cost associated with a first transmission of the first network device;
   transmitting the first transmission;
   determining a delay period associated with the first transmission based, at least in part, on the first transmission cost and a threshold transmission cost associated with the class of network devices, wherein said determining the delay period comprises,
      determining a time period across which to analyze the first transmission based, at least in part, on the first transmission cost and a threshold bandwidth utilization associated with the class of network devices, and subtracting the first transmission cost from the time period to determine the delay period; and delaying a second transmission of the first network device by the delay period.

2. The method of claim 1, further comprising:
causing a second network device of the class of network devices to delay a second device transmission by the delay period.

3. The method of claim 2, wherein said causing the second network device to delay the second device transmission comprises one of:
providing, from the first network device to the second network device, the first transmission cost via a packet associated with the first transmission, and
providing, from the first network device to the second network device, an indication of the delay period via the packet.

4. The method of claim 1, wherein said determining the delay period comprises determining the delay period based, at least in part, on a transmission duration associated with the first transmission.

5. The method of claim 1, wherein the first transmission cost is determined based, at least in part, on one or more members of a group consisting of a transmission duration associated with the first transmission, a transmission data rate, a priority associated with the first transmission, a type of the first transmission, and a length of the first transmission.

6. The method of claim 1, wherein the class of network devices are a part of a powerline communication network.

7. The method of claim 6, wherein the first network device comprises a Green PHY powerline device.

8. A method for controlling bandwidth comprising:
determining, at a first network device of a class of network devices, a first transmission cost associated with a first transmission of the first network device;
transmitting the first transmission;
determining a delay period associated with the first transmission based, at least in part, on the first transmission cost and a threshold transmission cost associated with the class of network devices;
determining a cumulative delay period based on the delay period and an unfulfilled delay period associated with one or more previous transmissions from a plurality of network devices of the class of network devices, wherein said determining the cumulative delay period comprises determining the unfulfilled delay period associated with one or more unfulfilled delay periods of the one or more previous transmissions that were transmitted by the plurality of network devices;
determining whether the cumulative delay period exceeds a threshold delay period; and
delaying a second transmission of the first network device by the cumulative delay period in response to determining that the cumulative delay period exceeds the threshold delay period.

9. The method of claim 8, further comprising transmitting the second transmission in response to determining that the cumulative delay period does not exceed the threshold delay period.

10. The method of claim 8, wherein said determining the cumulative delay period further comprises:
summing the unfulfilled delay period and the delay period to determine the cumulative delay period.

11. The method of claim 10, wherein said determining the cumulative delay period further comprises:

determining, for each previous transmission of the one or more previous transmissions, the cumulative delay period associated with the previous transmission based, at least in part, on a previous transmission cost associated with the previous transmission.

12. The method of claim 8, wherein the threshold delay period is determined based, at least in part, on at least one member of a group consisting of the threshold transmission cost and a threshold bandwidth utilization associated with the class of network devices.

13. The method of claim 8, further comprising:
causing a second network device of the class of network devices to delay a second device transmission by the cumulative delay period, in response to determining that the cumulative delay period exceeds the threshold delay period.

14. The method of claim 13, wherein said causing the second network device to delay the second device transmission comprises one of:
providing, from the first network device to the second network device, the first transmission cost, and
providing, from the first network device to the second network device, an indication of the delay period.

15. The method of claim 8, wherein the class of network devices are a part of a powerline communication network.

16. The method of claim 15, wherein the first network device comprises a Green PHY powerline device.

17. A first network device comprising:
a processor;
a network interface coupled with the processor; and
a memory coupled with the processor, the memory storing instructions which, when executed by the processor, cause the first network device to:
determine a first transmission cost associated with a first transmission of the first network device of a class of network devices of a communication network;
transmit the first transmission;
determine a delay period associated with the first transmission based, at least in part, on the first transmission cost and a threshold transmission cost associated with the class of network devices, wherein the instructions, when executed to cause the first network device to determine the delay period comprise the instructions that, when executed by the processor, further cause the first network device to,
determine a time period across which to analyze the first transmission based, at least in part, on the first transmission cost and a threshold bandwidth utilization associated with the class of network devices, and
subtract the first transmission cost from the time period to determine the delay period; and
delay a second transmission of the first network device by the delay period associated with the first transmission.

18. The first network device of claim 17, wherein the instructions, when executed, further cause the first network device to:
cause a second network device of the class of network devices to delay a second device transmission by the delay period.

19. The first network device of claim 17, wherein the instructions, when executed to cause the first network device to calculate the delay period comprise the instructions that, when executed by the processor, further cause the first network device to calculate the delay period based, at least in part, on a transmission duration associated with the first transmission.

20. The first network device of claim 17, wherein the class of network devices are a part of a powerline communication network.

21. A first network device comprising:
a processor;
a network interface coupled with the processor; and
a memory coupled with the processor, the memory storing instructions which, when executed by the processor, cause the first network device to:
determine a first transmission cost associated with a first transmission of the first network device of a class of network devices of a communication network;
transmit the first transmission;
determine a delay period associated with the first transmission based, at least in part, on the first transmission cost and a threshold transmission cost associated with the class of network devices;
determine a cumulative delay period based on the delay period and an unfulfilled delay period associated with one or more previous transmissions from a plurality of network devices of the class of network devices, wherein the instructions, when executed to determine the cumulative delay period comprise the instructions that, when executed by the processor, cause the first network device to,
determine the unfulfilled delay period associated with one or more unfulfilled delay periods of the one or more previous transmissions that were transmitted by the plurality of network devices;
determine whether the cumulative delay period exceeds a threshold delay period; and
delay a second transmission of the first network device by the cumulative delay period in response to determining that the cumulative delay period exceeds the threshold delay period.

22. The first network device of claim 21, wherein the instructions, when executed, further cause the first network device to transmit the second transmission in response to determining that the cumulative delay period does not exceed the threshold delay period.

23. The first network device of claim 21, wherein the instructions, when executed to determine the cumulative delay period comprise the instructions that, when executed by the processor, cause the first network device to:
sum the unfulfilled delay period and the delay period to determine the cumulative delay period.

24. The first network device of claim 21, wherein the instructions, when executed, further cause the first network device to:
cause a second network device of the class of network devices to delay a second device transmission by the cumulative delay period, in response to determining that the cumulative delay period exceeds the threshold delay period.

25. The first network device of claim 21, wherein the class of network devices are a part of a powerline communication network.

26. A non-transitory machine-readable medium, having instructions stored therein, which when executed by a processor causes the processor to perform operations that comprise:
determining a first transmission cost associated with a first transmission of a first network device of a class of network devices of a communication network;
transmitting the first transmission of the first network device;
determining a delay period associated with the first transmission based, at least in part, on the first transmission cost and a threshold transmission cost associated with the class of network devices, wherein operations for determining the delay period comprise operations for,
determining a time period across which to analyze the first transmission based, at least in part, on the first transmission cost and a threshold bandwidth utilization associated with the class of network devices, and
subtracting the first transmission cost from the time period to determine the delay period; and
delaying a second transmission of the first network device by the delay period.

27. The non-transitory machine-readable medium of claim 26, wherein the operations further comprise:
causing a second network device of the class of network devices to delay a second device transmission by the delay period.

28. The non-transitory machine-readable medium of claim 27, wherein causing the second network device to delay the second device transmission comprises one of:
providing, from the first network device to the second network device, the first transmission cost via a packet associated with the first transmission, and
providing, from the first network device to the second network device, an indication of the delay period via the packet.

29. The non-transitory machine-readable medium of claim 26, wherein determining the delay period comprises determining the delay period based, at least in part, on a transmission duration associated with the first transmission.

* * * * *